(12) United States Patent
Lee et al.

(10) Patent No.: US 8,666,375 B2
(45) Date of Patent: Mar. 4, 2014

(54) CUSTOMIZABLE MEDIA AUTO-REPLY SYSTEMS AND METHODS

(71) Applicant: RealNetworks, Inc., Seattle, WA (US)

(72) Inventors: Jun Lee, Seattle, WA (US); Robert D. Glaser, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 13/715,919

(22) Filed: Dec. 14, 2012

(65) Prior Publication Data
US 2013/0157629 A1    Jun. 20, 2013

Related U.S. Application Data

(60) Provisional application No. 61/570,770, filed on Dec. 14, 2011.

(51) Int. Cl.
*H04W 4/16* (2009.01)

(52) U.S. Cl.
USPC ............. 455/414.1; 455/412.1; 455/412.2; 455/466; 379/88.12; 379/88.26; 370/328

(58) Field of Classification Search
USPC ........... 455/419, 466, 412.1, 410, 418, 412.2, 455/414.1; 379/88.12, 88.17, 88.26; 370/329, 328; 709/207, 223, 220, 206
See application file for complete search history.

(56) References Cited

U.S. PATENT DOCUMENTS

| | | | |
|---|---|---|---|
| 5,926,537 A | 7/1999 | Birze | |
| 6,768,789 B1 | 7/2004 | Wilk | |
| 7,475,109 B1* | 1/2009 | Fletcher et al. | 709/204 |
| 7,711,095 B2* | 5/2010 | Erhart et al. | 379/88.13 |
| 8,089,958 B2* | 1/2012 | Elliott et al. | 370/356 |
| 8,270,933 B2* | 9/2012 | Riemer et al. | 455/345 |
| 8,315,361 B1* | 11/2012 | Becker et al. | 379/88.12 |
| 8,406,745 B1* | 3/2013 | Upadhyay et al. | 455/413 |
| 2002/0187794 A1* | 12/2002 | Fostick et al. | 455/466 |
| 2005/0195954 A1* | 9/2005 | Klein et al. | 379/201.04 |
| 2012/0281820 A1* | 11/2012 | Hamerschlag et al. | 379/88.17 |

FOREIGN PATENT DOCUMENTS

| | | |
|---|---|---|
| EP | 0893902 | 1/1999 |
| EP | 1768369 | 3/2007 |
| WO | 2011-010322 | 1/2011 |

OTHER PUBLICATIONS

RealNetworks, Inc. Ringback Tones Fully Personalized Ringback Tone Services Whitepaper Aug. 2007. Seattle, WA.

* cited by examiner

*Primary Examiner* — Mahendra Patel
(74) *Attorney, Agent, or Firm* — Æ ON Law; Adam L. K. Phiipp

(57) ABSTRACT

An auto-reply service provides to callers event-specific audiovisual media messages that were custom recorded on the callee's mobile-telephony device. The auto-reply service selects the media messages at least in part based on an event schedule associated with the callee.

10 Claims, 17 Drawing Sheets

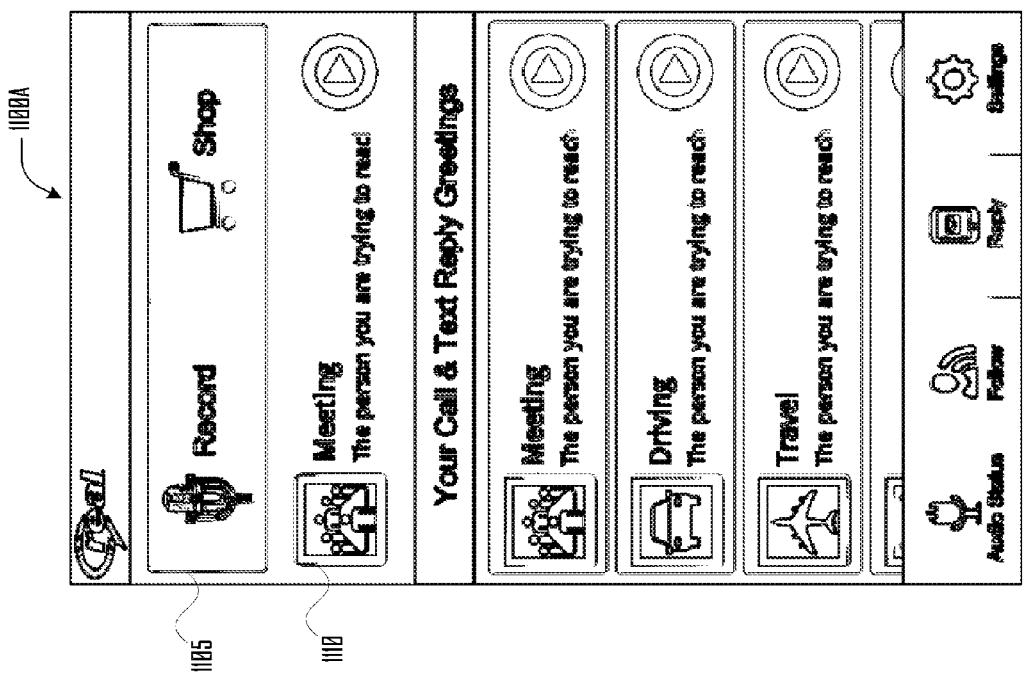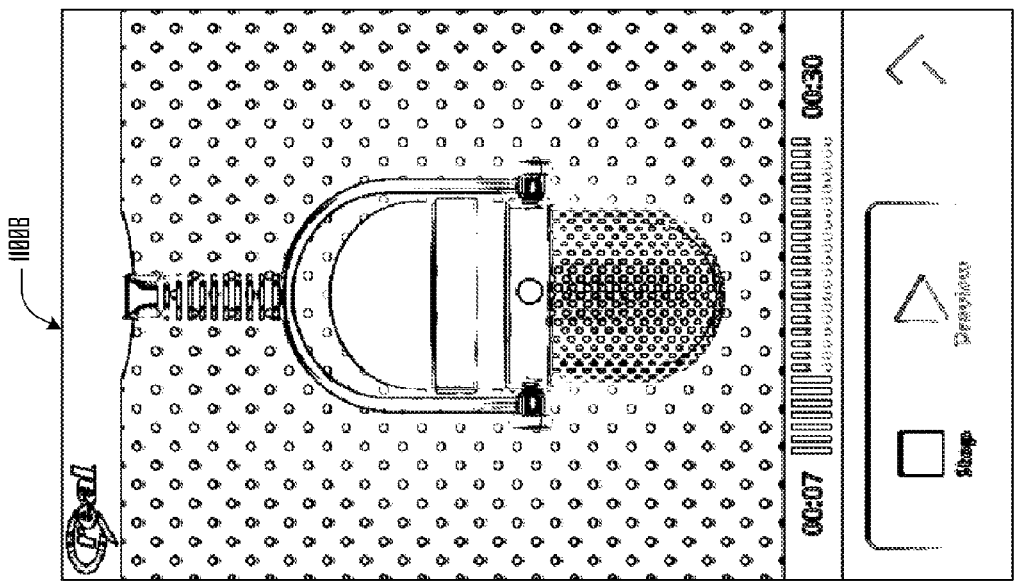
Fig.11

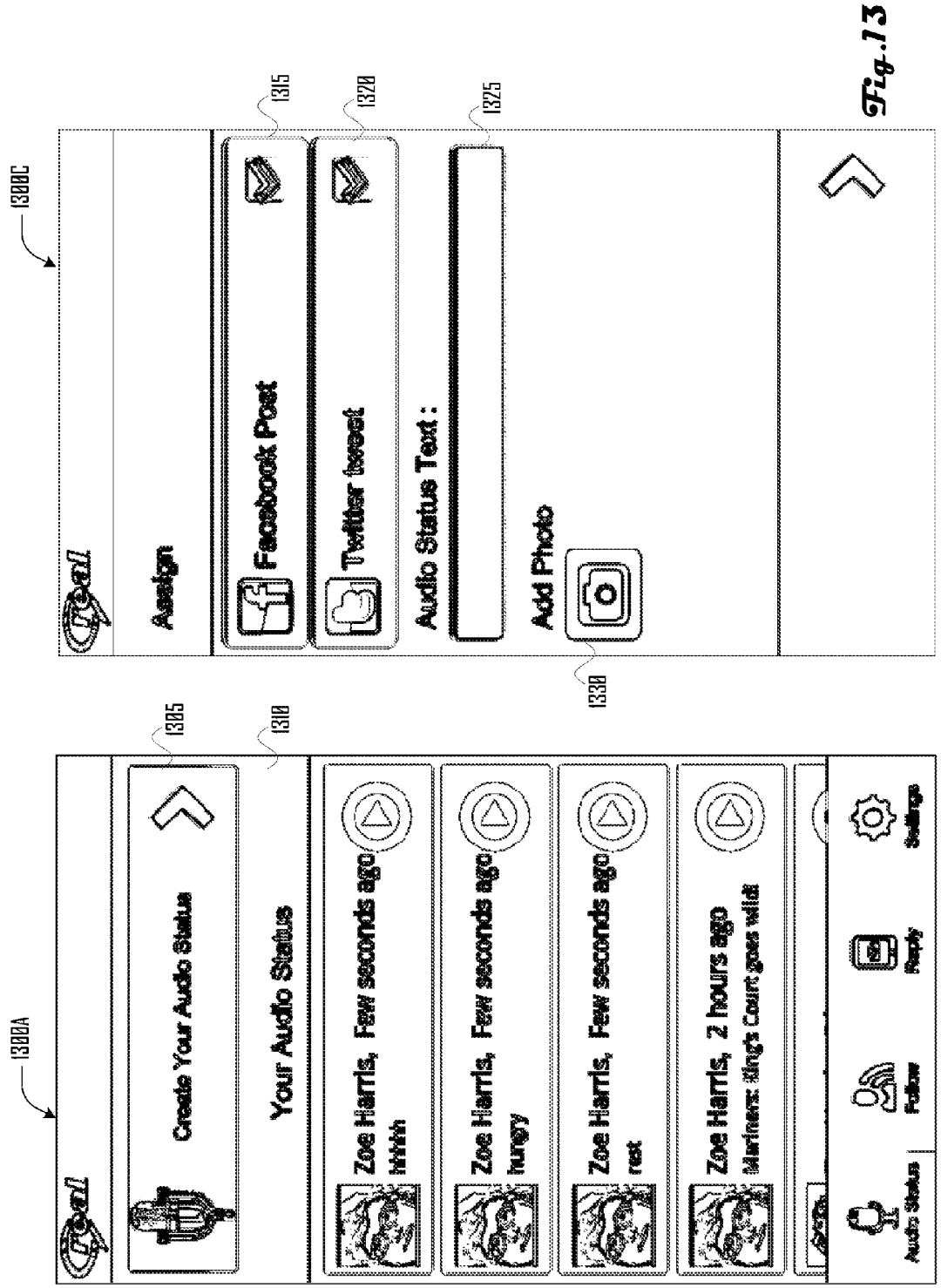

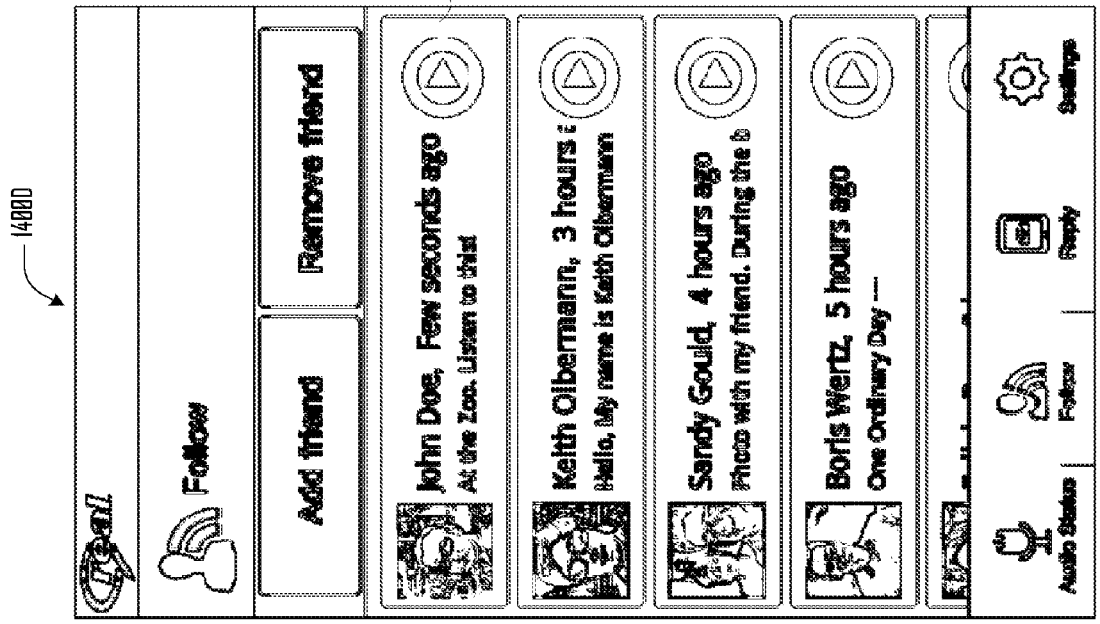

CUSTOMIZABLE MEDIA AUTO-REPLY SYSTEMS AND METHODS

CROSS-REFERENCE TO RELATED APPLICATIONS

This application claims the benefit of priority to U.S. Provisional Patent Application No. 61/570,770; titled "CUSTOMIZABLE MEDIA AUTO-REPLY SYSTEMS AND METHODS"; filed Nov. 22, 2011; and naming inventors Jun Lee and Robert D. Glaser. The above-cited application is incorporated herein by reference in its entirety, for all purposes.

FIELD

The present disclosure relates to the field of mobile communications, and more particularly, to providing customizable media auto-reply messages to callers of mobile users.

BACKGROUND

People may not answer calls to their mobile phones for a variety of reasons. For example, they may be attending an important meeting, driving a car, or traveling. Typically, the caller reaches the callee's voicemail, which prompts the caller to leave a message or to try calling back later. However, the generic greetings of a voicemail typically do not inform the caller of the reason for the callee's failure to answer the call during that particular event. Consequently, the callee may feel anxious or ignored. On the other hand, the phone calls may disrupt a meeting, distract a driver, or otherwise put undue pressure on the callee to return the calls.

BRIEF DESCRIPTION OF THE DRAWINGS

FIG. 11 illustrates screenshots showing user interfaces that may be used by an exemplary application, allowing a user to record an audio recording and associate it with an auto-reply event period, in accordance with one embodiment.

FIG. 13 illustrates screenshots showing user interfaces that may be used by an exemplary application, allowing a user to record and post an audio recording as a voice status, in accordance with one embodiment.

FIGS. 14*a-b* illustrate screenshots showing user interfaces that may be used by an exemplary application, allowing a user to follow posted voice status recordings of selected people, in accordance with one embodiment.

DESCRIPTION

Figure 1:
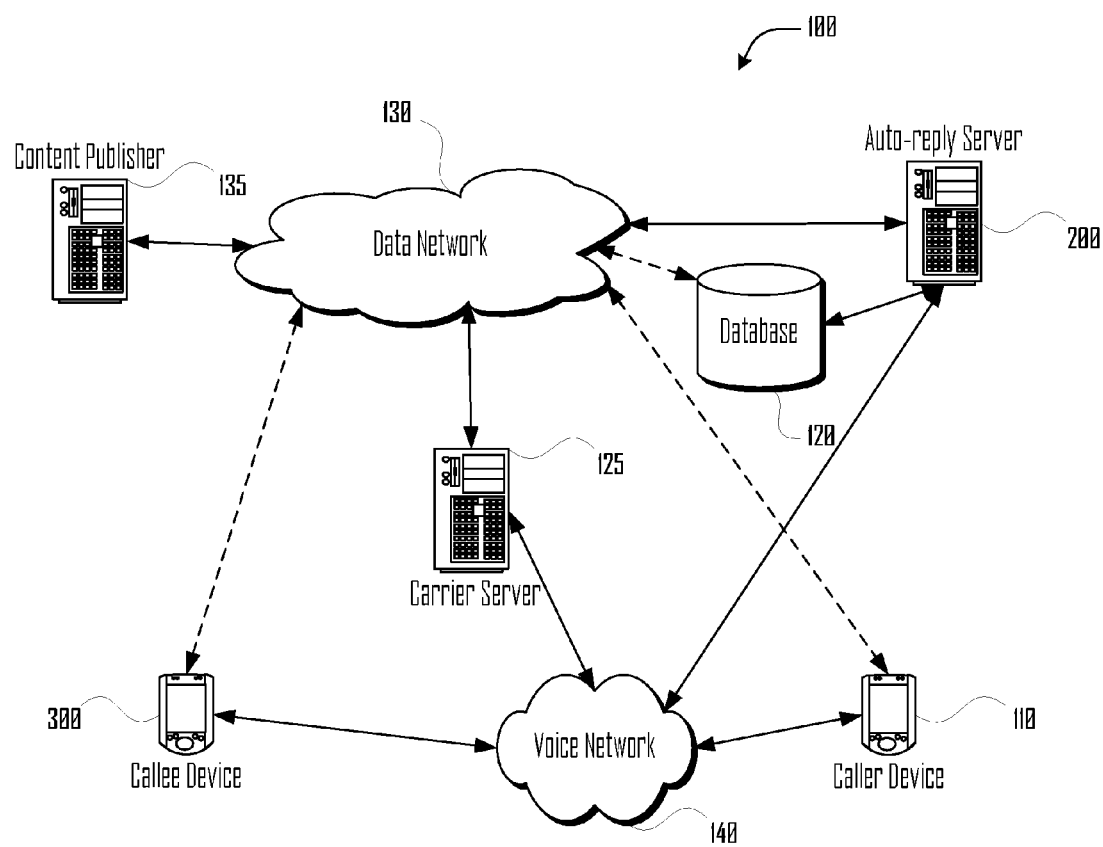
FIG. 1 illustrates an exemplary customizable media auto-reply system, in accordance with one embodiment.

In accordance with various embodiments, an auto-reply service may provide customizable media messages to callers of the mobile users during user-specified time periods when the mobile users are unavailable to answer the calls.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary customizable media auto-reply system 100, in accordance with one embodiment. In customizable media auto-reply system 100, auto-reply server 200, callee device 300, carrier server 125, and content publisher 135 are connected to data network 130.

Auto-reply server 200 is also in communication with database 120. In some embodiments, auto-reply server 200 may communicate with database 120 via data network 130, a storage area network ("SAN"), a high-speed serial bus, and/or via the other suitable communication technology.

In various embodiments, auto-reply server 200 and/or database 120 may comprise one or more physical and/or logical devices that collectively provide the functionalities described herein. In some embodiments, auto-reply server 200 and/or database 120 may comprise one or more replicated and/or distributed physical or logical devices. In some embodiments, auto-reply server 200 may provide the functionalities of an interactive voice response ("IVR") server and/or ringback tone server (not shown). In other embodiments, auto-reply server 200 may communicate with an IVR server and/or ringback tone server. An IVR server typically provides automated interactions between a caller using a touch-tone telephone (e.g., using dual-tone multi-frequency signaling, or DTMF) and a computer. Examples of IVR applications include telephone banking, telephone voting, credit card services, and the like.

In some embodiments, auto-reply server 200 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like. In some embodiments, database 120 may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

In various embodiments, data network 130 may include the Internet, a local area network ("LAN"), a wide area network ("WAN"), a cellular data network, and/or other data network.

In various embodiments, content publisher 135 may provide data content to web sites, blogs, microblogs, social networks, and the like. For example, content publisher 135 may include Facebook, provided by Facebook, Inc. of Palo Alto, Calif., Twitter, provided by Twitter Inc. of San Francisco, Calif., and the like. In some embodiments, auto-reply server 200 may provide features similar to those provided by a content publisher 135.

As used herein, the term "caller" refers to the party making a phone call or similar telephonic communication. The terms "callee" and "callee user" are used interchangeably to refer to the party being called by a caller.

In various embodiments, caller device 110 and callee device 300 may include landline telephones, mobile phones, satellite phones, tablets, laptops, desktop PCs, or other mobile-telephony devices that allow users to make and receive telephonic communications.

In various embodiments, calls between caller device 110 and callee device 300 are connected via voice network 140, which transmits voice communications. Voice network 140 may include a public switched telephone network ("PSTN"), a cellular network, a packet-switched network such as the Internet, and the like.

In some embodiments, voice network 140 includes a PSTN that supports the Signaling System No. 7 (SS7) protocols, defined by International Telecommunication Union Telecommunication Standardization Sector (ITU-T). In particular, the voice network 140 may support the ISDN User Part (ISUP) protocol of the SS7 protocols, which allows a switch in a PSTN to signal call-related information (e.g., called/calling party number, redirecting number, etc.) to the next switch in the PSTN.

In various embodiments, voice network 140 is operated by a carrier, which is a provider of telecommunication services to its subscribers. Examples of carrier services may include Verizon Wireless, provided mainly by Verizon Communications Inc. of Basking Ridge, N.J.; AT&T Mobility, provided by AT&T Inc. of DeKalb County, Ga.; Sprint, provided by Sprint Nextel Corporation of Overland Park, Kans.; T-Mobile, provided by Deutsche Telecom AG of Bonn, Germany, and the like.

In various embodiments, carrier server 125 is operated by a carrier and connected to voice network 140. In some embodiments, carrier server 125 may comprise one or more replicated and/or distributed physical or logical devices. Carrier server 125 may also be connected to data network 130, such as the Internet.

In some embodiments, caller device 110 and callee device 300 may be connected to data network 130 via carrier server 125. In other embodiments, caller device 110 and callee device 300 may also be connected to data network 130 directly, for example, via a Wi-Fi connection.

For illustrative purpose, carrier server 125 includes devices that handle incoming and outgoing calls for callee device 300. Thus, a call from caller device 110 to callee device 300 goes through carrier server 125 and vice versa.

Call forwarding typically refers to the redirection or forwarding of incoming calls for a callee to a third party. Call forwarding is typically performed by the carrier. In the following discussion, the phrases "initiating", "enabling", and "turning-on" call forwarding are used interchangeably to refer to the action of causing the carrier to start forwarding incoming calls or other telephonic communications to a third party. And the phrase "terminating", "disabling", and "turning off" call forwarding are similarly used interchangeably to refer to the action of stopping the carrier from forwarding incoming calls or other telephonic communications to a third party.

For illustrative purpose, carrier server 125 includes devices that handle requests to turn on and off call forwarding for a subscriber. In some embodiments, carrier server 125 may provide an application programming interface ("API") to turn on and off call forwarding for a subscriber. In other embodiments, carrier server 125 may provide a dial-tone interface to turn on and off call forwarding for a subscriber, such as in accordance with the Unstructured Supplementary Service Data ("USSD") protocol supported by GSM-compliant devices, via an IVR interface provided by carrier server 125, or the like.

Figure 2:
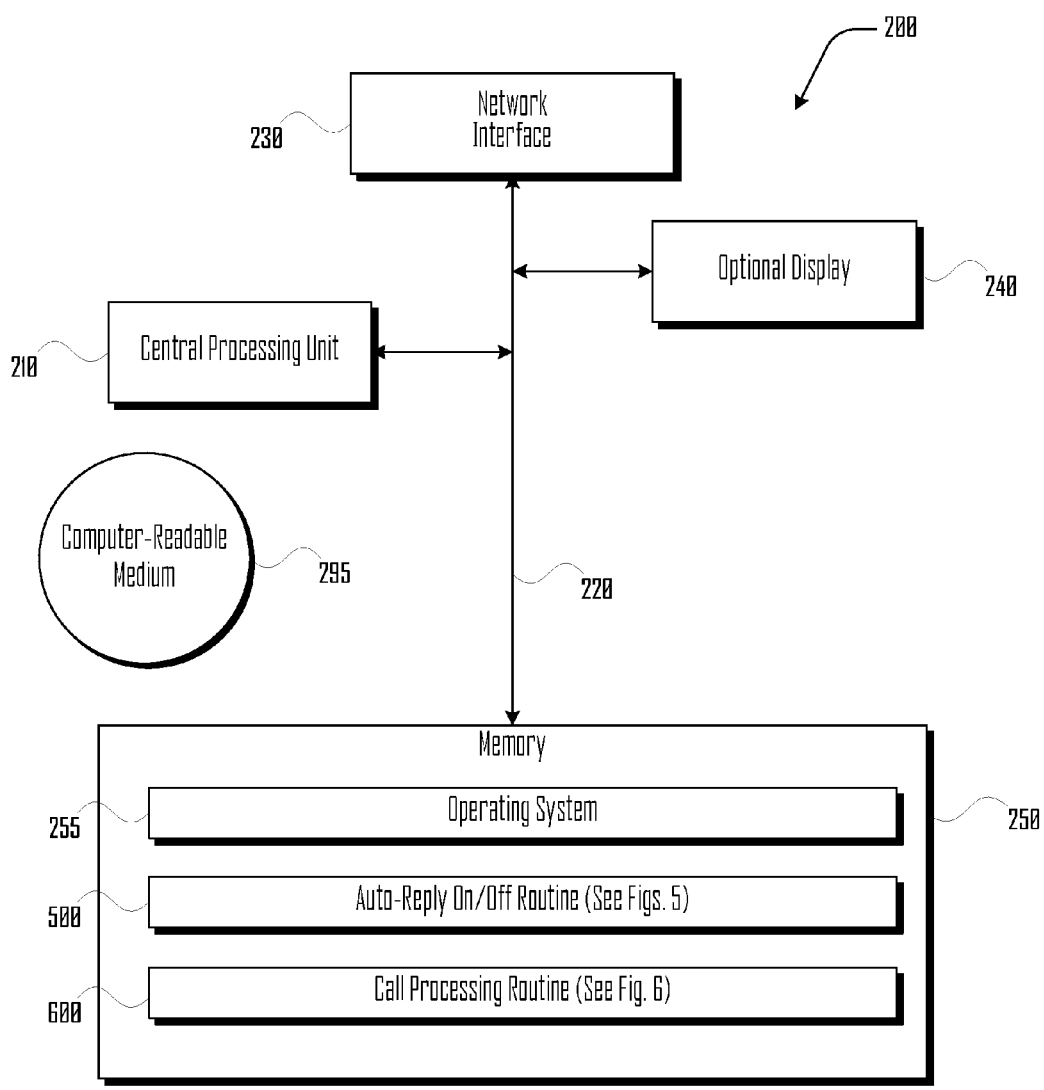
FIG. 2 illustrates several components of an exemplary auto-reply server in accordance with one embodiment.

FIG. 2 illustrates several components of an exemplary auto-reply server 200 in accordance with one embodiment. In some embodiments, auto-reply server 200 may include many more components than those shown in FIG. 2. However, it is not necessary that all of these generally conventional components be shown in order to disclose an illustrative embodiment. As shown in FIG. 2, auto-reply server 200 includes a network interface 230 for connecting to data network 130.

Auto-reply server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for an auto-reply on/off routine 500 (see FIG. 5, discussed below) and a call processing routine 600 (see FIG. 6, discussed below). In addition, the memory 250 also stores an operating system 255. These software components may be loaded into memory 250 of auto-reply server 200 using a drive mechanism (not shown) associated with a non-transient computer readable storage medium 295, such as a floppy disc, tape, DVD/CD-ROM drive, memory card, or the like. In some embodiments, software components may alternately be loaded via the network interface 230, rather than via a non-transient computer readable storage medium 295.

In some embodiments, a portion of the memory 250 may be used as a cache (not shown), which temporarily stores data so that future requests for the data can be served faster.

Auto-reply server 200 also communicates via bus 220 with database 120 (see FIG. 1). In various embodiments, bus 220 may comprise a storage area network ("SAN"), a high-speed serial bus, and/or via other suitable communication technology. In some embodiments, auto-reply server 200 may communicate with database 120 via network interface 230. In other embodiments, database 120 may be integrated as part of auto-reply server 200.

Figure 3:
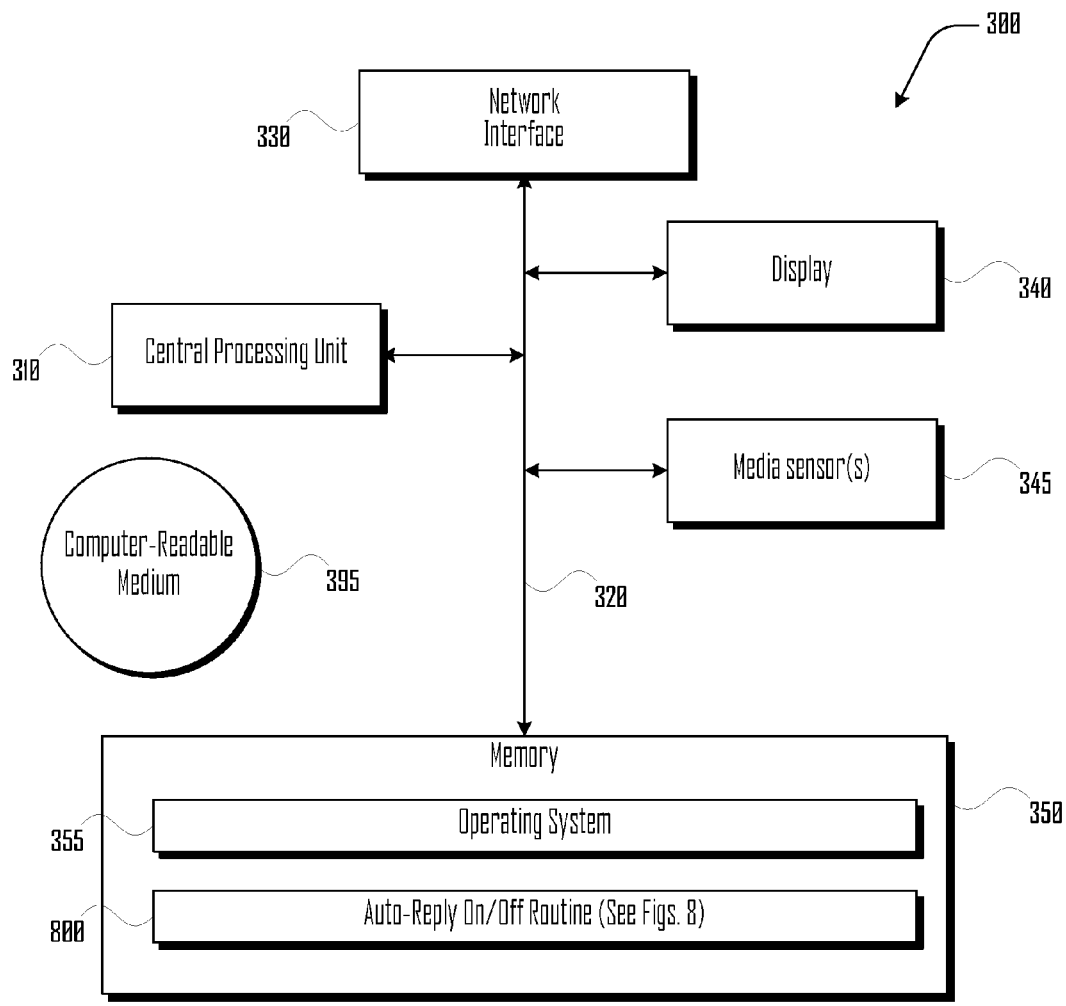
FIG. 3 illustrates several components of an exemplary callee device, in accordance with one embodiment.

FIG. 3 illustrates several components of an exemplary callee device 300, in accordance with one embodiment. In some embodiments, callee device 300 may include many more components than those shown in FIG. 3. However, it is not necessary that all of these generally conventional components be shown in order to disclose an illustrative embodiment. As shown in FIG. 3, callee device 300 may include a network interface 330 for connecting to data network 130.

Callee device 300 also includes a processing unit 310, a memory 350, one or more audiovisual media sensors 345 (e.g., one or more mocrophones, cameras, or the like), and a display interface 340, all interconnected along with the network interface 330 via a bus 320. The memory 350 generally comprises a random access memory ("RAM"), a read only memory ("ROM"), and a permanent mass storage device, such as a disk drive, flash device, or the like. The memory 350 stores program code for an auto-reply on/off application 800. In addition, the memory 350 also stores an operating system 355. These software components may be loaded from a computer readable storage medium 395 into memory 350 of the mobile application device 300 using a read mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

Figure 4:
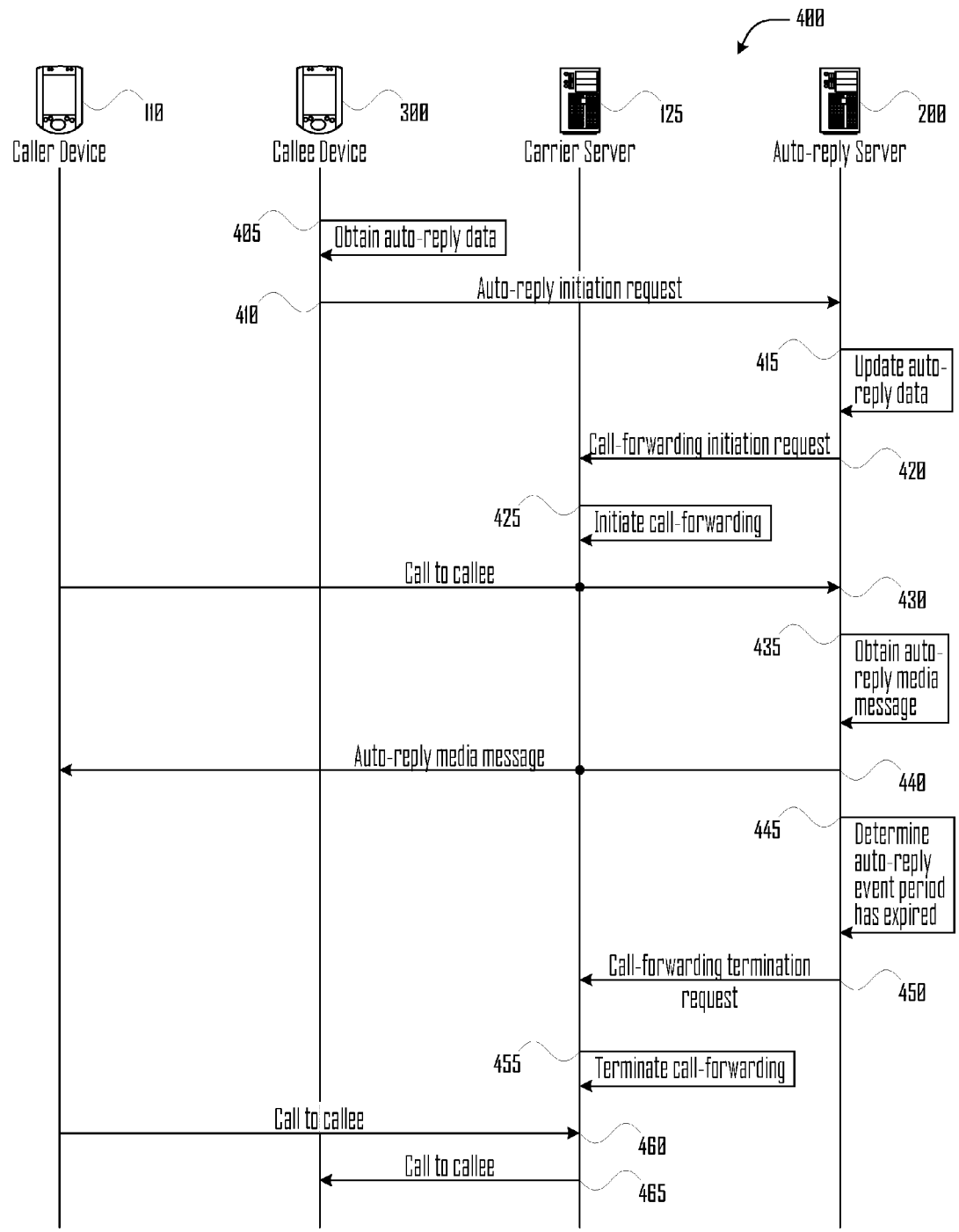
FIG. 4 illustrates an exemplary series of communications between caller device, callee device, carrier server, and auto-reply server, in accordance with one embodiment.

FIG. 4 illustrates an exemplary series of communications between caller device 110, callee device 300, carrier server 125, and auto-reply server 200, in accordance with one embodiment. The illustrated series of communications shows an exemplary scenario in which the caller operating caller device 110 makes two calls to the callee user operating callee device 300, once after the auto-reply service for the callee user has been initiated, and again after the auto-reply service has been terminated. In this embodiment, auto-reply server 200 initiates and terminates call forwarding for the callee user.

Beginning the illustrated sequence of operations, callee device 300 obtains 405 auto-reply data from the callee user. In various embodiments, auto-reply data includes data associated with one or more auto-reply event periods. As used herein, an "auto-reply event period" refers to a period of time during which the auto-reply service is on. In various embodiments, an auto-reply event period may have an associated event type, such as "meeting," "driving," "traveling," or "gym," and/or an associated time period, such as 6 pm-7 pm on Nov. 28, 2011.

In some embodiments, an auto-reply event period may be created by the user of callee device 300. In some other embodiments, an auto-reply event period may be pre-loaded onto callee device 300. In yet some other embodiments, a user may be able to download an auto-reply event period onto callee device 300, e.g., from the Internet. For example, a user may download a company meeting event period with pre-defined time period.

In some embodiments, the user may specify the time period associated with an auto-reply event period by setting the start and/or end time associated with the auto-reply event period. In some other embodiments, the system may provide default time settings for an auto-reply event period. In yet some other embodiments, an auto-reply event period may be set to be recurrent. For example, one may set up an auto-reply event period "driving" to occur daily between 8 am and 9 am.

In various embodiments, each auto-reply event period is associated with an auto-reply media message. As used herein, the term "auto-reply media message" refers to an audio or video recording that is played back to a caller after the callee user activates the associated auto-reply event period. In various embodiments, an auto-reply media message may include an audio or video clip recorded by the user, a pre-loaded media file on callee device 300, a media file downloaded from the Internet, such as a media file in .wav, .mp3, .mp4, or .avi format, and the like. For example, the auto-reply media message may include the following message recorded by the callee user.

Sorry. I'm in a meeting now. Please call me back after 7 pm.

Still referring to FIG. 4, callee device 300 sends a request 410 to auto-reply server 200 to initiate the auto-reply service. In various embodiments, the request 410 to initiate auto-reply service may include some or all of the auto-reply data obtained at 405. In particular, request 410 to initiate auto-reply service may include an indication of the current auto-reply event period. The indication of the current auto-reply event period may include the current auto-reply event type, a number, or the like. For example, the request 410 to initiate auto-reply service may include data such as the following.

```
{"callee phone number": "425-123-4567,
    "current auto-reply event period": "meeting",
    {"auto-reply event type": "meeting", "auto-reply start time":
    "2011-11-28 9:00:00", "auto-reply end time": "2011-11-
    28 10:00:00"}, "media message": "meeting.wav"},
    {"auto-reply event type": "driving", "auto-reply start time":
    "daily 8:00:00", "auto-reply end time": "daily 9:00:00"}, "media
    message": "driving.wav"}}
```

In another embodiment, the request 410 to initiate auto-reply service may include data such as the following.

```
{"callee phone number": "425-123-4567, "current auto-reply event
    period": "3"}
```

In some embodiments, callee device 300 may send auto-reply data to auto-reply server 200 before sending request 410 to initiate auto-reply service for subsequent use by auto-reply server 200.

In some embodiments, an auto-reply event period may start due to the occurrence of some pre-defined events, such as the reaching of the start time associated with the current auto-reply event. In other embodiments, an auto-reply event period may start in response to some user actions, such as a user activating a control (e.g., an "Activate auto-reply" button, link, or similar control), the changing of the geographic location of the user, and the like.

Upon receiving request 410 to initiate auto-reply service, auto-reply server 200 updates 415 the auto-reply data associated with the callee user. In some embodiments, the auto-reply data may be stored in a storage device (e.g., memory 250 or database 120) that is connected to auto-reply server 200 locally or remotely. In other embodiments, the auto-reply data may be stored by a cloud storage service provider.

In various embodiments, updating auto-reply data may include updating the current auto-reply event period associated with the callee user, updating the time period associated with the current auto-reply event period, storing additional auto-reply event periods associated with the callee user, and the like.

Figure 9:
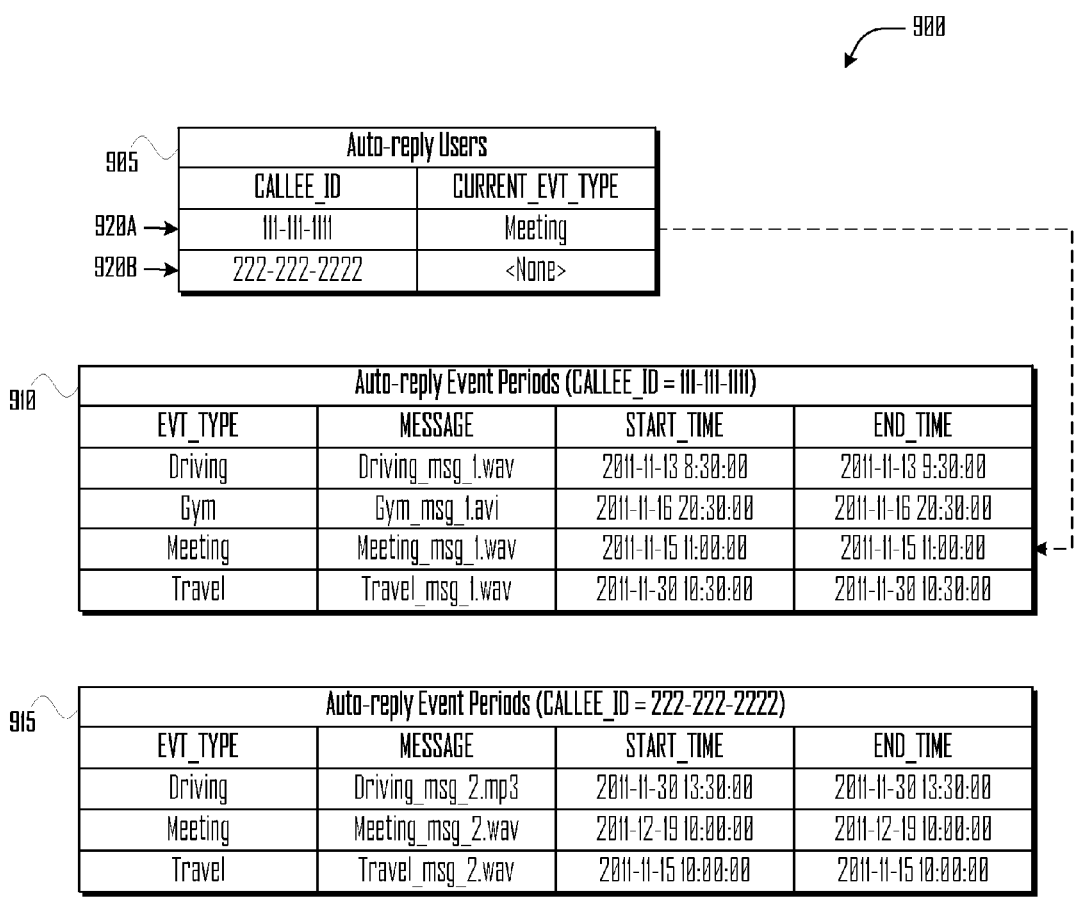
FIG. 9 illustrates exemplary data structures for storing auto-reply data, such as may be implemented on auto-reply server, in accordance with one embodiment.

FIG. 9 illustrates exemplary data structures for storing auto-reply data, such as may be implemented on auto-reply server 200, in accordance with one embodiment. Here, auto-reply users table 905 stores the current auto-reply event type associated with each callee user of the auto-reply service. The CALLEE_ID column stores the callee ID associated with a callee user. Typically, callee ID is the telephone number of the callee user but it may also be some other unique identifier that identifies the callee user. The CURRENT_EVT_TYPE column stores the current auto-reply event type associated with the callee user, or none if the callee user does not have a current auto-reply event type. For example, according to row 920A of auto-reply users table 905, callee with callee ID 111-111-1111 has current auto-reply event types "Meeting." And according row 920B, callee with callee ID 222-222-2222 does not have any current auto-reply event type.

CALLEE_ID and CURRENT_EVT_TYPE may be used to look up information (e.g., media message, end time) about the current event period associated with a callee in the auto-reply event periods table. An auto-reply event periods table (e.g., 910 and 915) stores auto-reply event period data associated with a user. The EVT_TYPE, MESSAGE, START_TIME and END_TIME columns store the event type, name or path to media message, start time and end time associated with an auto-reply event period. For example, tables 910 and 915 illustrate the auto-reply event period data associated with the callee users with callee IDs 111-111-1111 and 222-222-2222, respectively.

In some embodiments, auto-reply users table 905 and auto-reply event periods tables 910 and 915 may be part of the same table. In other embodiments, there may be more tables than what is illustrated. In some embodiments, there may be more or fewer columns in the tables than what is illustrated.

Referring back to FIG. 4, auto-reply server 200 sends a request 420 to initiate call forwarding to carrier server 125. In some embodiments, auto-reply server 200 may use an API provided by carrier server 125 to initiate call forwarding. In other embodiments, auto-reply server 200 may use a dial-tone interface provided by carrier server 125 to initiate call forwarding, such as via an IVR interface provided by carrier server 125.

In various embodiments, request 420 to initiate call forwarding includes the phone number of the callee user and the forwarding phone number (i.e., the phone number to redirect the incoming calls to). The forwarding phone number is typically associated with auto-reply server 200, and/or with an IVR feature (not shown) associated with auto-reply server 200.

In response to the request 420 to initiate call forwarding, carrier server 125 initiates 425 call forwarding for callee such that subsequent calls to the callee user are forwarded to auto-reply server 200. For example, when a caller makes a call 430 to the callee user, carrier server 125 forwards the call to auto-reply server 200.

Auto-reply server 200 obtains 435 the auto-reply media message associated with the current auto-reply event period for the callee user, for example, by querying database 120 with the callee user's telephone number. Auto-reply server 200 then provides the auto-reply media message 440 to the caller. See discussion of FIG. 6 for more details.

Subsequently, auto-reply server 200 determines 445 that the current auto-reply event period has expired. In some embodiments, an auto-reply event period may expire due to the occurrence of a pre-defined event, such as the reaching of the end time associated with the current auto-reply event. In other embodiments, an auto-reply event period may expire in response to a user actions, such as a user activating a control (e.g., an "End auto-reply" button, link, or similar control), the changing of the geographic location of the user, and the like.

After determining the expiration of the current auto-reply event period, auto-reply server 200 sends a request 450 to terminate call forwarding to carrier server 125. In some embodiments, auto-reply server 200 may use an API provided by carrier server 125 to terminate call forwarding. In other embodiments, auto-reply server 200 may use a dial-tone interface provided by carrier server 125 to terminate call forwarding, such as in accordance with the USSD protocol or via an IVR interface provided by carrier server 125. In various embodiments, request 450 to terminate call forwarding includes the phone number of the callee user.

In response to request 450 to terminate call forwarding, carrier server 125 turns off 455 call forwarding for the callee user such that subsequent calls to the callee user, such as 460, are routed directly 465 to the callee user.

Figure 5:
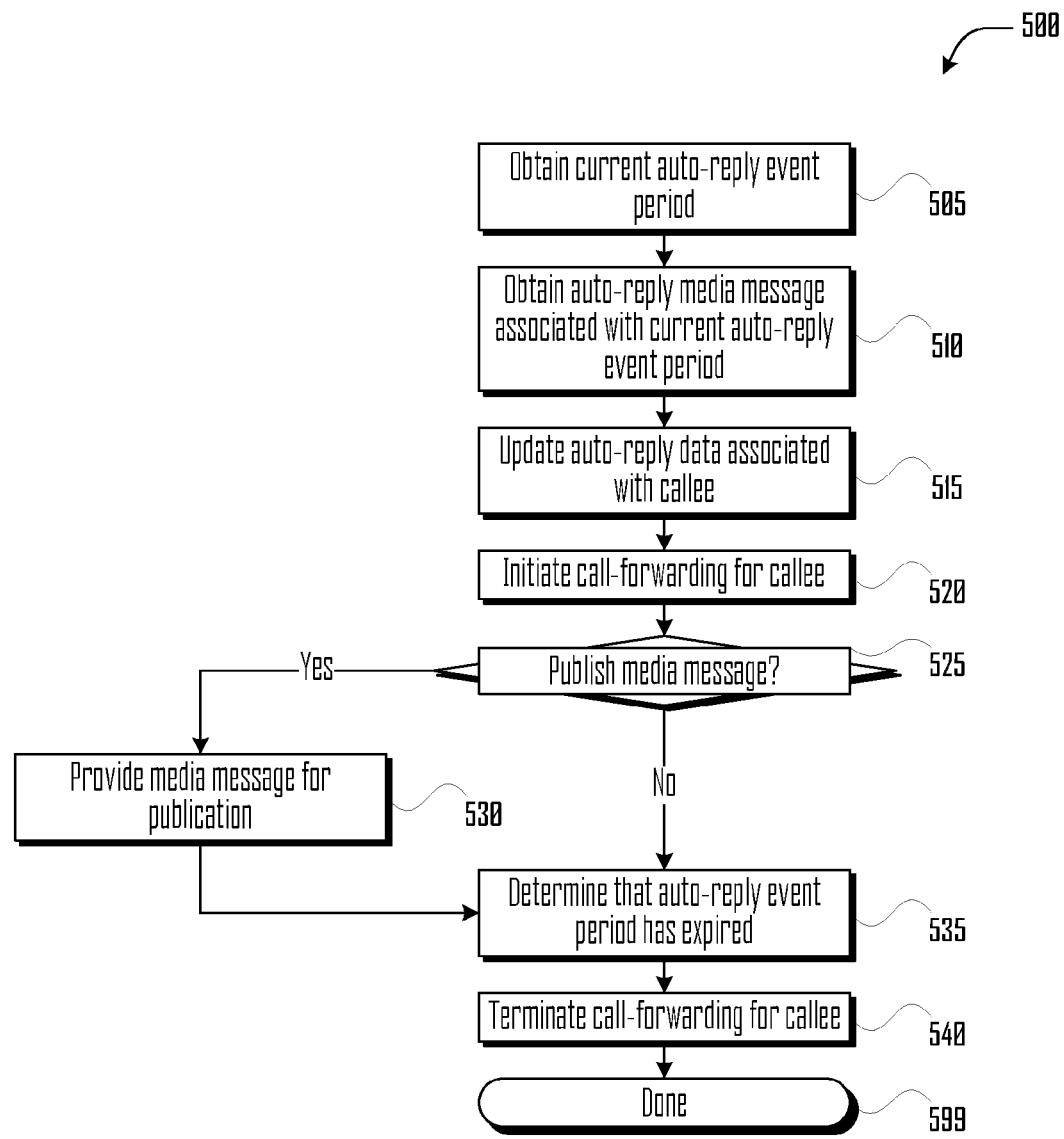
FIG. 5 illustrates an auto-reply on/off routine, such as may be performed by auto-reply server, in accordance with one embodiment.

FIG. 5 illustrates an auto-reply on/off routine, such as may be performed by auto-reply server 200, in accordance with one embodiment. Beginning in block 505, routine 500 obtains the current auto-reply event period for the callee user. Typically, auto-reply server 200 obtains auto-reply data associated with a callee from callee device 300. In some other embodiments, routine 500 may obtain the current auto-reply event period and the associated auto-reply media message by looking up existing auto-reply data for the user, for example, by using the data structures illustrated in FIG. 9.

Figure 10:
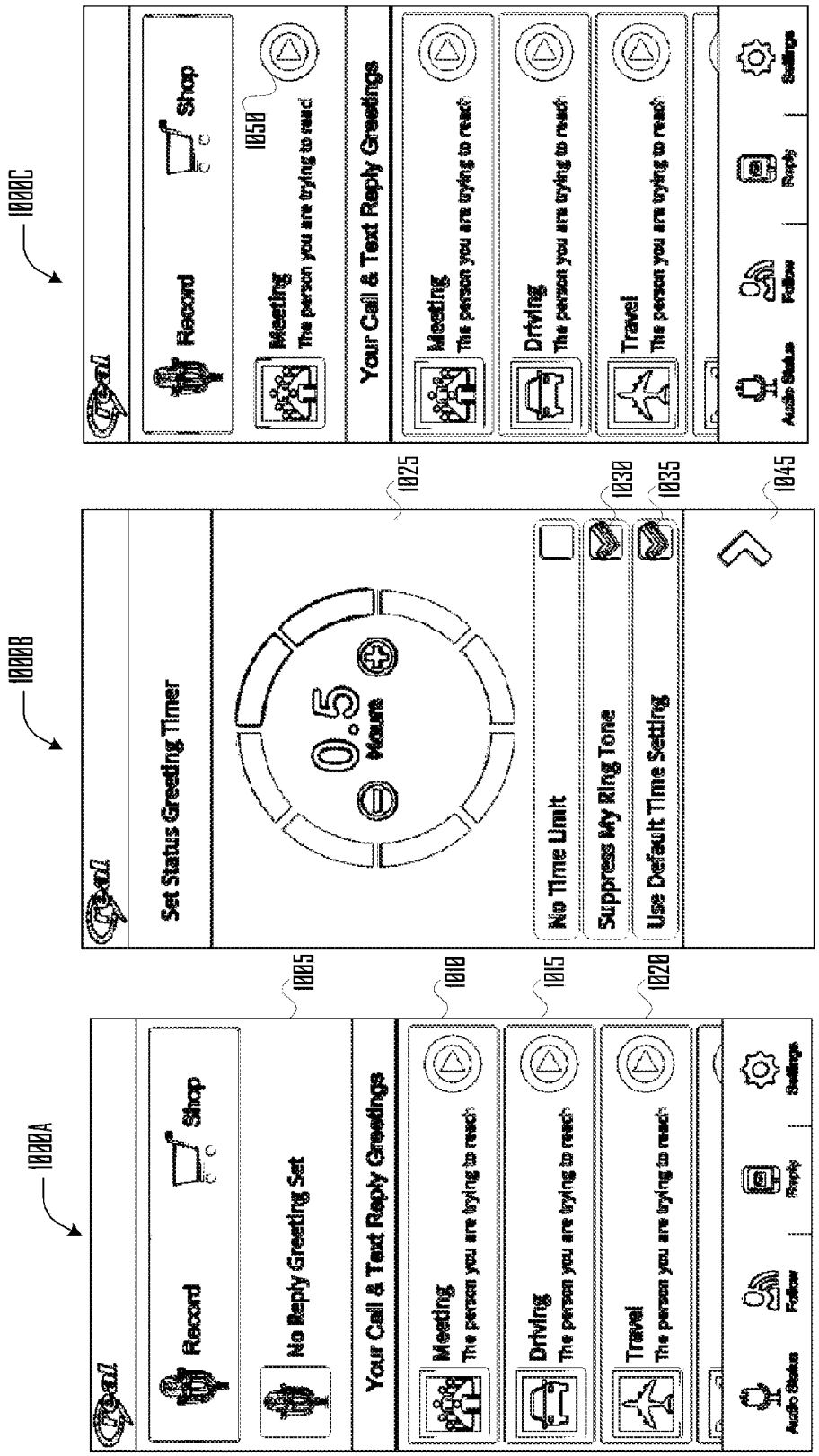
FIG. 10 illustrates screenshots showing user interfaces that may be used by an exemplary application, allowing a user to set up a current auto-reply event period, in accordance with one embodiment.

FIG. 10 illustrates screenshots showing user interfaces that may be used by an exemplary application, allowing a user to set up a current auto-reply event period, in accordance with one embodiment. Screenshot 1000A shows a user interface of the application displaying a list of existing auto-reply event types, such as "Meeting" 1010, "Driving" 1015, "Travel" 1020, and the like.

Screenshot 1000B shows a user interface of the application after the user selects an auto-reply event type (e.g., "Meeting" 1010), allowing the user to specify the time period associated with the event type. For example, the user may set a timer 1025. The user interface may allow the user to set additional settings associated with the auto-reply event period, such as whether to have a time limit associated with the auto-reply event 1030, whether to use a default time setting for the auto-reply event period 1035, and the like.

Screenshot 1000C shows a user interface of the application displaying the currently-selected auto-reply event period (e.g., "Meeting" 1050). Referring back to FIG. 5, in block 510, routine 500 obtains the auto-reply media message associated with the current auto-reply event period. Typically, auto-reply server 200 obtains auto-reply data including the auto-reply media message associated with the current auto-reply event period from callee device 300.

FIG. 11 illustrates screenshots showing user interfaces that may be used by an exemplary application, allowing a user to record an audio recording and associate it with an auto-reply event period, in accordance with one embodiment. Screenshot 1100A shows a user interface of the application displaying the currently-selected auto-reply event period (e.g., "Meeting" 1110), with a control 1105 (e.g., a "Record" button, link, or similar control) that allows the user to record a message. Screenshot 1100B shows a user interface of the application after the user activates the control 1105 to record a message. The user interface allows the user to record an audio message to be associated with the currently-selected auto-reply event period.

Figure 12:
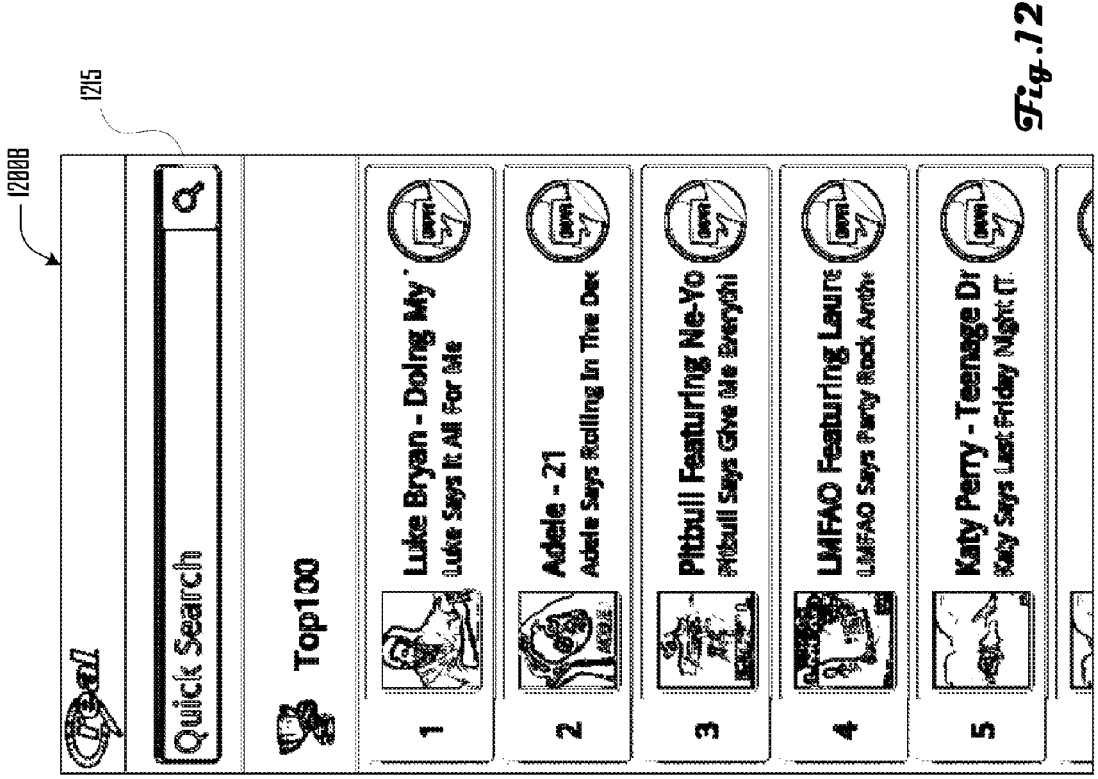
FIG. 12 illustrates screenshots showing user interfaces that may be used by an exemplary application, allowing a user to shop for a media message and associate it with an auto-reply event period, in accordance with one embodiment.

FIG. 12 illustrates screenshots showing user interfaces that may be used by an exemplary application, allowing a user to shop for a media message and associate it with an auto-reply event period, in accordance with one embodiment. Screenshot 1200A shows a user interface of the application displaying the currently-selected auto-reply event period (e.g., "Meeting" 1205), with a control 1210 (e.g., a "Shop" button, link, or similar control) that allows the user to shop for a message. Screenshot 1200B shows a user interface of the application after the user activates the control 1210 to shop for a message. The user interface displays media files, e.g., songs from the Top 100 list, that the user may purchase and may allow the user to search for a particular media file. The content for the shopping interface may be provided by auto-reply server 200, an online media vendor, and the like.

Referring back to FIG. 5, in block 515, routine 500 updates the auto-reply data associated with the callee user. As discussed above, updating auto-reply data may include updating the current auto-reply event period, updating the time period associated with the current auto-reply event period, storing additional auto-reply event periods associated with the callee user, and the like. In some embodiments, routine 500 may skip block 515 and proceed directly to block 520.

In block 520, routine 500 initiates call forwarding for the callee user. In some embodiments, routine 500 may sent a request to initiate call forwarding for the callee user via an API provided by carrier server 125. In other embodiments, routine 500 may sent a request to initiate call forwarding for the callee user via a dial-tone interface provided by carrier server 125, such as the USSD protocol or an IVR interface. In various embodiments, routine 500 provides carrier server 125 with the callee user's phone number and the phone number assigned to auto-reply server 200.

In some embodiments, routine 500 may send a request to initiate call forwarding for the callee user due to the occurrence of some pre-defined event, such as the reaching of the start time associated with the current auto-reply event. In other embodiments, routine 500 may sent a request to initiate call forwarding for the callee user in response to a request sent from callee device 300, such as a request to initiate auto-reply, an indication of the changing of the geographic location of the user, and the like.

In block 525, routine 500 determines whether to publish a media message, such as a "voice status". In various embodiments, auto-reply server 200 may allow users to post media messages to web sites, blogs, social networks, and the like. For example, a user may post an audio or video clip to his/her Facebook or Twitter account as an indication of his/her current status or mood. If not, then routine 500 skips to block 525.

However, if routine 500 determines that a media message should be published, then in block 530, routine 500 provides the media message for publication. In some embodiments, the media message may be an existing auto-reply media message. In some other embodiments, the media message may be a media message other than an auto-reply media message. In various embodiments, auto-reply server 200 may allow users to post other information, e.g., texts and photos, along with the media message.

FIG. 13 illustrates screenshots showing user interfaces that may be used by an exemplary application, allowing a user to record and post an audio recording as a voice status, in accordance with one embodiment. Screenshot 1300A shows a user interface of the application allowing the user to select a voice status from an existing list of voice status recordings or record a voice status one on the fly. Screenshot 1100B (see FIG. 11) shows a user interface of the application after the user activates a control 1305 (e.g., a "Create Your Audio Status" button, link, or similar control), allowing the user to record an audio recording. Screenshot 1300C shows a user interface of the application after the user selects or records a voice status, allowing the user to select the content publishers, such as a Facebook post 1315, or Twitter tweet 1320, to post the recorded voice status. In addition, the user may post text 1325 and photos 1330 along with the voice status to the selected content publishers.

In various embodiments, auto-reply server 200 may obtain data related to media message publication from callee device 300 including the user's preference (e.g., what websites to post to) as well as the information to publish (e.g., media message, text, photos). In various embodiments, auto-reply server 200 may provide the data to one or more content publishers 135, such as Facebook, Twitter, and the like.

In various embodiments, auto-reply server 200 may allow a user to "follow" the posted media messages, such as the voice status recordings, of selected people. For example, the user may follow the posted media messages of other auto-reply service users including Facebook/Twitter friends, celebrities, and the like.

Figure 14A:
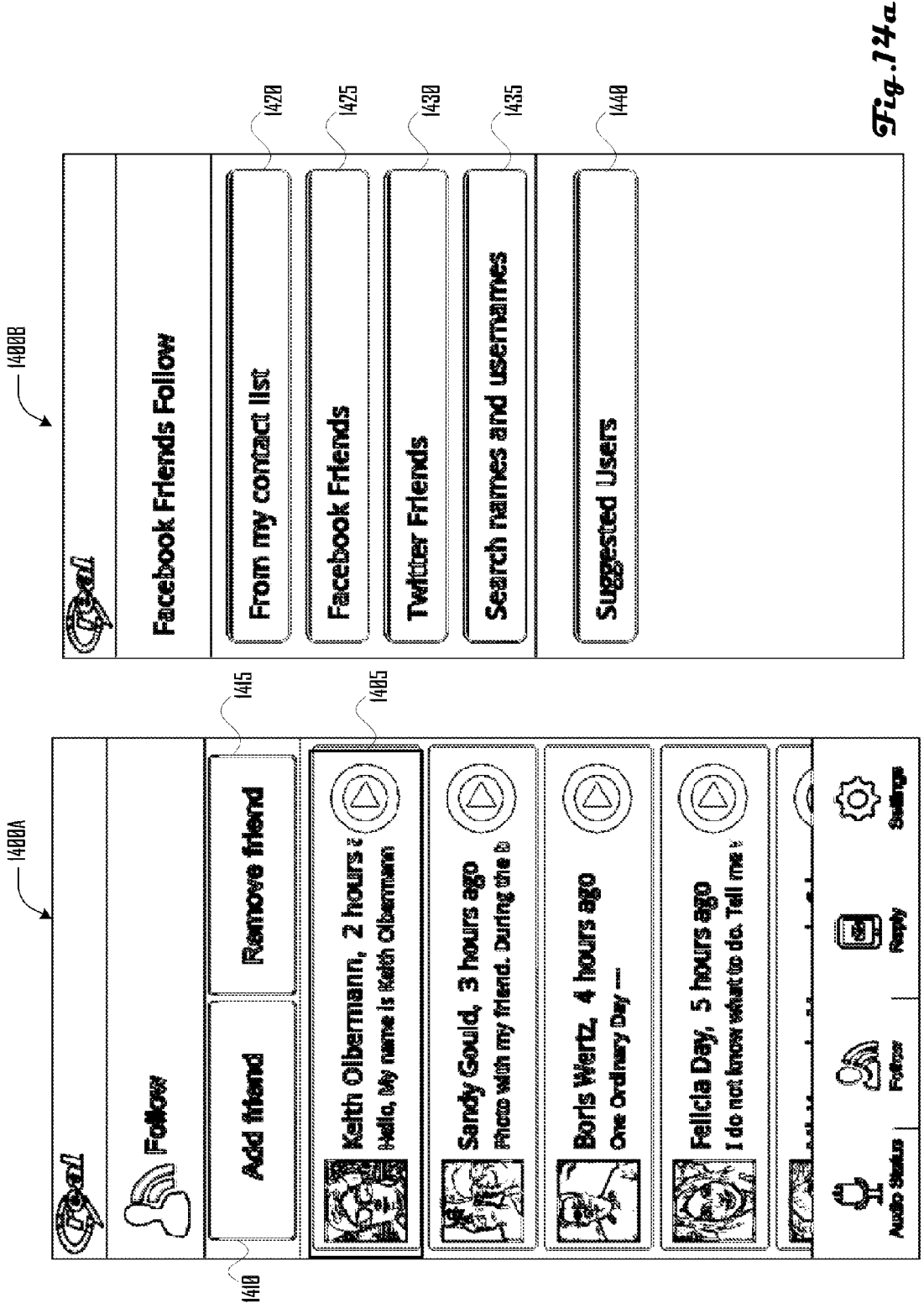

FIGS. 14*a-b* illustrate screenshots showing user interfaces that may be used by an exemplary application, allowing a user to follow posted voice status recordings of selected people, in accordance with one embodiment. Screenshot 1400A shows a user interface of the application displaying a list of auto-reply service users whose voice statuses are currently being followed by the user. The user interface allows the user to select and play the voice status recording for a selected user 1405 on the list. The user interface also contains controls (e.g., an "Add friend" 1410 or "Remove friend" 1415 button, link, or similar control) for the user to add and/or remove people to follow.

Screenshot 1400B shows a user interface of the application allowing the user to select the source of people to add. For example, the user interface may allow the user to select other auto-reply service users from the user's contact list/phone book 1420. The application may display only those contacts who are also auto-reply service users, for example, by looking up their phone numbers at auto-reply server 200.

The user interface may also allow the user to select Facebook friends 1425, and/or Twitter friends 1430, who are also auto-reply service users. In various embodiments, a user provides Facebook/Twitter account information to auto-reply server 200, for example, when he/she posts media messages to Facebook/Twitter or when he/she signs up for the auto-reply service. Auto-reply server 200 may then retrieve the Facebook/Twitter friends lists with the provided account information and display only those friends on the lists who are also auto-reply service users. In various embodiments, auto-reply server 200 may determine that a Facebook/Twitter friend is also an auto-reply service user by comparing the Facebook/Twitter account information of that friend (e.g., email address, phone number, Facebook/Twitter user name) with the auto-reply service users information.

The user interface may also allow the user to search 1435 for names of or suggest 1440 other auto-reply service users to the user. Screenshot 1400C shows a user interface of the application displaying the user's Facebook friends. The user interface allows the user to select a person to follow by checking a checkbox 1445 next to the person's name (e.g., "John Doe"). The user interface may also display an indication, such as "Following" tag 1450, next to the name of a person who is already being followed by the user. Screenshot 1400D shows a user interface of the application displaying the newly added person 1455 to follow.

In some embodiments, auto-reply server 200 may push a user's media message to the followers of that user. For example, auto-reply server 200 may send updates (e.g., latest voice status) to the devices of the followers of the user. In other embodiments, an application running on a follower's device may pull updates (e.g., latest voice statuses) of the people that the user follows from auto-reply server 200. Such pushing or pulling may be performed in real time or on a periodic basis.

Referring back to FIG. 5, in block 535, routine 500 determines that auto-reply event period has expired. As described above, routine 500 may determine expiration of an auto-reply event period in response to the occurrence of a pre-defined event, such as the reaching of the end time associated with the current auto-reply event, in response to a user action, such as a user activating a control (e.g., an "End auto-reply" button, link, or similar control), or the like.

In block 540, routine 500 terminates call forwarding for the callee user. In some embodiments, routine 500 may sent a request to terminate call forwarding for the callee user in accordance with an API provided by carrier server 125. In other embodiments, routine 500 may sent a request to terminate call forwarding for the callee user in accordance with a dial-tone interface provided by carrier server 125, such as in accordance with the USSD protocol or via an IVR interface. In various embodiments, routine 500 provides carrier server 125 with the callee user's phone number.

Routine 500 ends in block 599.

Figure 6:
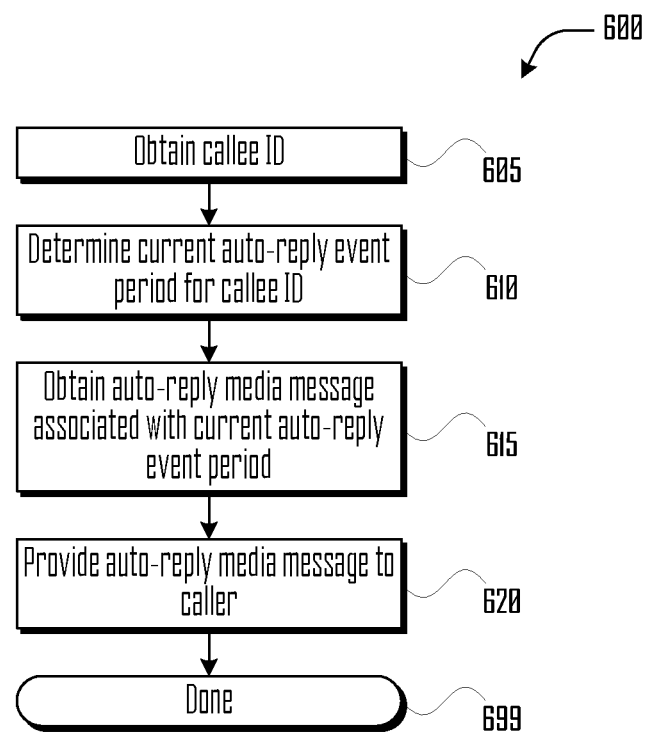
FIG. 6 illustrates a call processing routine, such as may be performed by auto-reply server, in accordance with one embodiment.

FIG. 6 illustrates a call processing routine, such as may be performed by auto-reply server 200, in accordance with one embodiment. Beginning in block 605, routine 600 obtains the callee ID of the forwarded call. Typically, callee ID is the telephone number of the callee user but it may also be some other unique identifier that identifies the callee user. In some embodiments, auto-reply server 200 may obtain the callee ID from the carrier. For example, auto-reply server 200 may obtain the caller's phone number and callee user's telephone number from parameters, Calling party number and Redirecting number, respectively, according to the ISUP protocol of the SS7 protocols, described earlier.

In block 610, routine 600 obtains the current auto-reply event period for the callee user. In some embodiments, routine 600 may look up a data structure similar to auto-reply users table 905 of FIG. 9 to find the current auto-reply event period associated with the callee ID.

In block 615, routine 600 obtains the auto-reply media message associated with the current auto-reply event period for the callee user. In some embodiments, routine 600 may look up a data structure similar auto-reply event periods table 910 of FIG. 9 to obtain the name or path of the associated media message. Routine 600 may then retrieve the media message file using the name or path, which may be stored in a compressed format (e.g., a .zip file).

Using FIG. 9 as an example, suppose auto-reply server 200 receives a forwarded call for a callee with the phone number 111-111-1111. Routine 600 would obtain the current auto-reply event type for the callee user ("Meeting") by looking up auto-reply users table 905. Then, routine 600 would obtain the name or path of the media message ("Meeting_msg_1.wav") associated with auto-reply event period by looking up the auto-reply event periods table 910. Finally, routine 600 may retrieve the actual media message file by following the path to the media message. In some embodiments, media messages may be stored in a storage device (e.g., memory 250 or database 120) that is connected to auto-reply server 200 locally or remotely. In other embodiments, they may be stored by a cloud storage service provider.

Referring back to FIG. 6, in block 620, routine 600 provides the auto-reply media message associated with the current auto-reply event period to the caller. In some embodiments, routine 600 plays back the media message to the caller. In some other embodiments, routine 600 may process the auto-reply media message prior to providing it to the caller. For example, routine 600 may decompress a compressed auto-reply media message.

As another example, routine 600 may generate a synthesized media message based on a set of parameters such as the user's location, the auto-reply event type, the auto-reply time period, and/or a user-recorded media message. For example, user may provide a media message with placeholders, such as the following.

Sorry. I'm at _____ now. Please call me back after¬.

An auto-reply media message may be generated by filling the first blank based on the auto-reply event type (e.g., "meeting") associated with the auto-reply event period and the second blank based on the end time of the associated auto-reply time period (e.g., "7 pm"). The resulting auto-reply media message that is played back to the caller may be the following.

Sorry. I'm at a meeting now. Please call me back after¬ 7 pm.

Routine 600 ends in block 699. In some embodiments, auto-reply server 200 may allow a caller to leave a message for a callee user. Further, auto-reply server 200 may provide the callee user with a list of missed calls and messages when the auto-reply service is on.

In some embodiments, auto-reply server 200 may allow the callee user to specify a list of phone numbers such that the caller gets notified (e.g., via text message) when a caller with a listed phone number calls when the auto-reply service is on.

Figure 7:
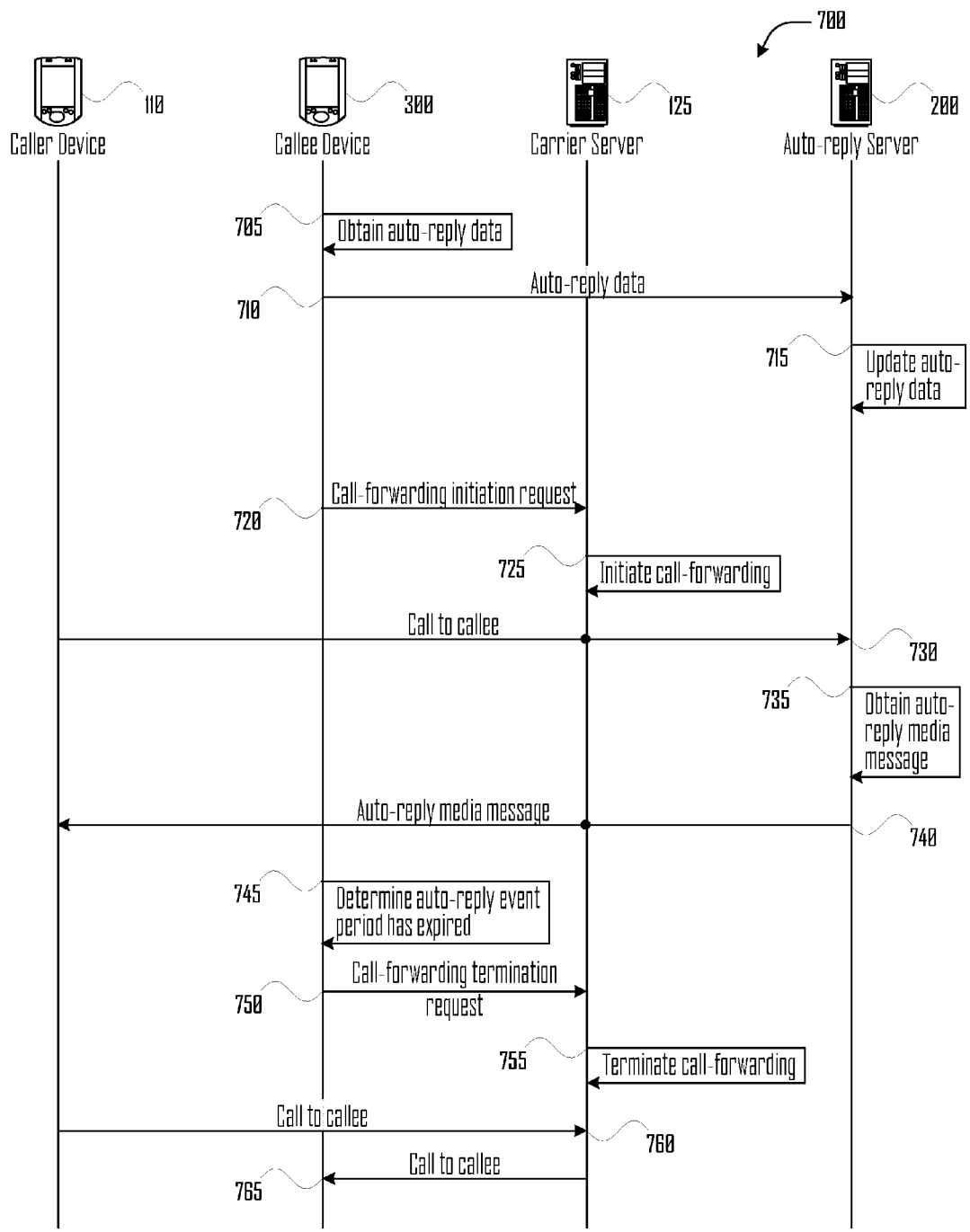
FIG. 7 illustrates an exemplary series of communications between caller device, callee device, carrier server, and auto-reply server, in accordance with one embodiment.

FIG. 7 illustrates an exemplary series of communications between caller device 110, callee device 300, carrier server 125, and auto-reply server 200, in accordance with one embodiment. The illustrated series of communications is similar to that illustrated in FIG. 4. However, in this embodiment, callee device 300, rather than auto-reply server 200, initiates and terminates call forwarding for a callee user.

Beginning the illustrated sequence of operations, callee device 300 obtains 705 auto-reply data from the callee user. FIGS. 10-12 shows screenshots of user interfaces that may be used by an exemplary application running on callee device 300, obtaining auto-reply data from the user. The auto-reply data obtained is similar to that obtained at 505 of FIG. 5.

Subsequently, callee device 300 provides auto-rely data 710 to auto-reply server 200. Upon receiving the auto-reply data 710, auto-reply server 200 may update 715 the auto-reply data associated with the callee user, for example, by updating the current auto-reply event period, adding additional auto-reply event periods, and the like.

An application running on callee device 300 initiates auto-reply by sending a request 720 to initiate call forwarding to carrier server 125. In some embodiments, the application may use an API provided by carrier server 125 to initiate call forwarding. In other embodiments, the application may use a dial-tone interface provided by carrier server 125 to initiate call forwarding, such as in accordance with the USSD protocol or via an IVR interface.

In various embodiments, request 720 to initiate call forwarding includes the phone number of the callee user and the forwarding phone number (i.e., the phone number to redirect the incoming calls to). The forwarding phone number is typically associated with auto-reply server 200, and/or with an IVR feature (not shown) associated with auto-reply server 200. For example, a user with a GSM-compliant device (e.g., an AT&T user) may dial the USSD code 218001112222# to turn on call forwarding to the phone number 8001112222. As another example, a user with a non-GSM device (e.g., a Verizon user) may dial *728001112222 to turn on call forwarding to the same phone number via an IVR interface provided by the carrier.

In various embodiments, an application running on callee device 300 automatically sends request 720 to initiate call forwarding to carrier server 125. For example, the application may automatically dial the USSD code or IVR code for turning on call forwarding.

In various embodiments, an application running on callee device 300 may send request 720 to initiate call forwarding to carrier server 125 in response to a user action (e.g., the user's activating an "Activate auto-reply" button, link, or similar control), a notification sent by auto-reply server 200, the occurrence of a pre-defined event (e.g., the reaching of the start time of an auto-reply event period), or the like.

Upon receiving request 720 to initiate call forwarding, carrier server 125 initiates 725 call forwarding for callee such that subsequent calls to the callee user are forwarded to auto-reply server 200. For example, when a caller makes a call 730 to the callee user, carrier server 125 forwards the call to auto-reply server 200.

When auto-reply server 200 receives forwarded call 730 to callee, it obtain 735 the auto-reply media message associated with the current auto-reply event period for the callee user and provides the auto reply media message 740 to the caller, in a manner similar to that described in FIG. 4.

In some embodiments, an application may determine 745 that the current auto-reply event period has expired due to the occurrence of a pre-defined event, such as the reaching of the end time associated with the current auto-reply event. In some other embodiments, the application may determine 745 that the current auto-reply event period has expired in response to a user action, e.g., the user's activating a control (e.g., an "End auto-reply" button, link, or similar control), the user's changing his geographic location, or the like. In yet some other embodiments, the application may determine 745 that the current auto-reply event period has expired in response to a notification sent by auto-reply server 200, another device, or the like.

In various embodiments, an application running on callee device 300 terminates auto-reply by sending a request 750 to terminate call forwarding to carrier server 125. In some embodiments, the application may use an API provided by carrier server 125 to terminate call forwarding. In other embodiments, the application may use a dial-tone interface provided by carrier server 125 to terminate call forwarding, such as in accordance with the USSD protocol or via an IVR interface. For example, a user with a GSM-compliant device (e.g. an AT&T user) may dial the USSD code ##21# to turn off call forwarding. As another example, a user with a non-GSM device (e.g., a Verizon user) may dial *720 to turn off call forwarding via an IVR interface provided by the carrier.

In various embodiments, an application running on callee device 300 automatically sends request 750 to terminate call forwarding to carrier server 125. For example, the application may automatically dial the USSD code or IVR code for turning off call forwarding.

In various embodiments, an application running on callee device 300 may send request 750 to terminate call forwarding to carrier server in response to a user action (e.g., the user's activating an "End auto-reply" button, link, or similar control), a notification sent by auto-reply server 200, the occurrence of a pre-defined event (e.g., the reaching of the end time of an auto-reply event period), or the like.

In response to the request 750 to terminate call forwarding, carrier server 125 may turn off 755 call forwarding for the callee user such that subsequent calls to the callee user, such as 760, are routed directly 765 to the callee user.

If callee device 300 is powered off or out of range when the current auto-reply event period expires, callee device 300 may be unable to terminate call forwarding and callers may continue to hear an auto-reply media message when they call the callee user. To reduce the risk of such errors, callee device 300 may implement an application to determine, after callee device 300 is powered up or regains reception, whether any auto-reply event period has expired during that time. If so, the application sends a request to carrier server 125 to turn off call forwarding for the callee user.

Figure 8:
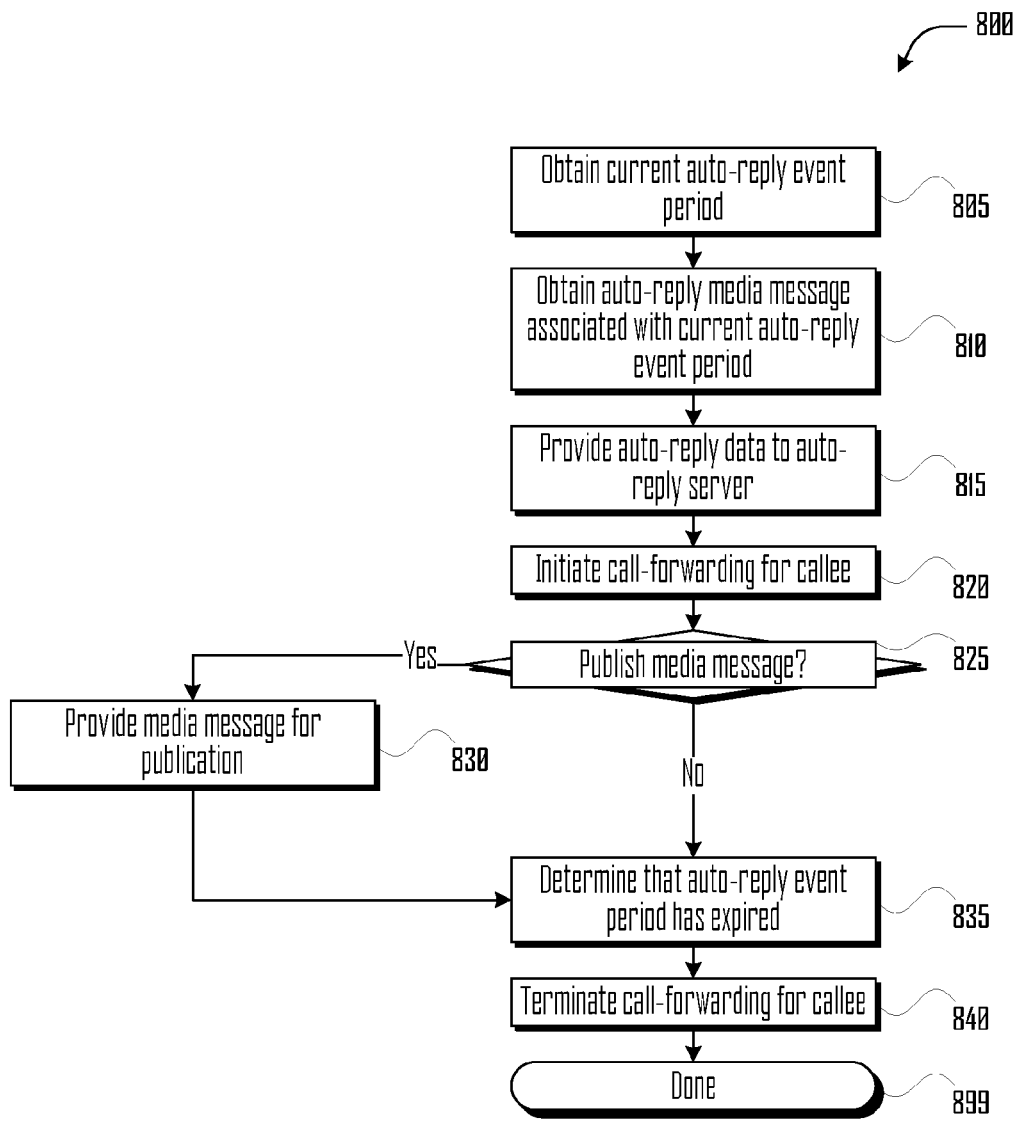
FIG. 8 illustrates an auto-reply on/off routine, such as may be performed by an application running on callee device, in accordance with one embodiment.

FIG. 8 illustrates an auto-reply on/off routine, such as may be performed by an application running on callee device 300, in accordance with one embodiment. Beginning in block 805, routine 800 obtains the current auto-reply event period for the callee user. FIG. 10 illustrates screenshots showing user interfaces that may be used by an exemplary application, allowing a user to set up a current auto-reply event period, in accordance with one embodiment.

In block 810, routine 800 obtains the auto-reply media message associated with current auto-reply event period. FIG. 11 illustrates screenshots showing user interfaces that may be used by an exemplary application, allowing a user to record an audio recording and associate it with an auto-reply event period, in accordance with one embodiment. FIG. 12 illustrates screenshots showing user interfaces that may be used by an exemplary application, allowing a user to shop for a media message and associate it with an auto-reply event period, in accordance with one embodiment.

In block 815, routine 800 provides the auto-reply data associated with the callee user to auto-reply server 200. In block 820, routine 800 initiates call forwarding for the callee user. As described in FIG. 7, routine 800 may initiate call forwarding by relying on an API or a dial-tone interface, such as in accordance with the USSD protocol via an IVR interface, provided by carrier server 125.

In block 825, routine 800 determines whether to publish a media message, such as a voice status, to web sites, blogs, social networks, and the like. If not, then routine 800 skips to block 825.

If routine 800 determines that a media message should be published, then in block 830, routine 800 provides the media message for publication. In various embodiments, routine 800 obtains data including the user's preference (e.g., where to post), the information to post/publish (e.g., media message, text, photos, etc.), and the like. See discussion of block 530 of FIG. 5 and FIG. 13.

Routine 800 may push media messages onto client device 300 or client device 300 may pull media messages from auto-reply server 200 (see discussion of block 530 of FIG. 5).

In block 835, routine 800 determines that the current auto-reply event period has expired (see discussed of item 745 of FIG. 7). In block 840, routine 800 terminates call forwarding for the callee user. As described in FIG. 7, routine 800 may terminate call forwarding by relying on an API or a dial-tone interface, such as in accordance with the USSD protocol or via an IVR interface, provided by carrier server 125.

As described above, to reduce the risk of missing turning off call forwarding while powered off or out of range, routine 800 may determine, after callee device 300 is powered up or regains reception, whether any auto-reply event period has expired during that time. If so, routine 800 may send a request to carrier server 125 to turn off call forwarding for the callee user.

Routine 800 ends in block 899. Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

Figure 15:
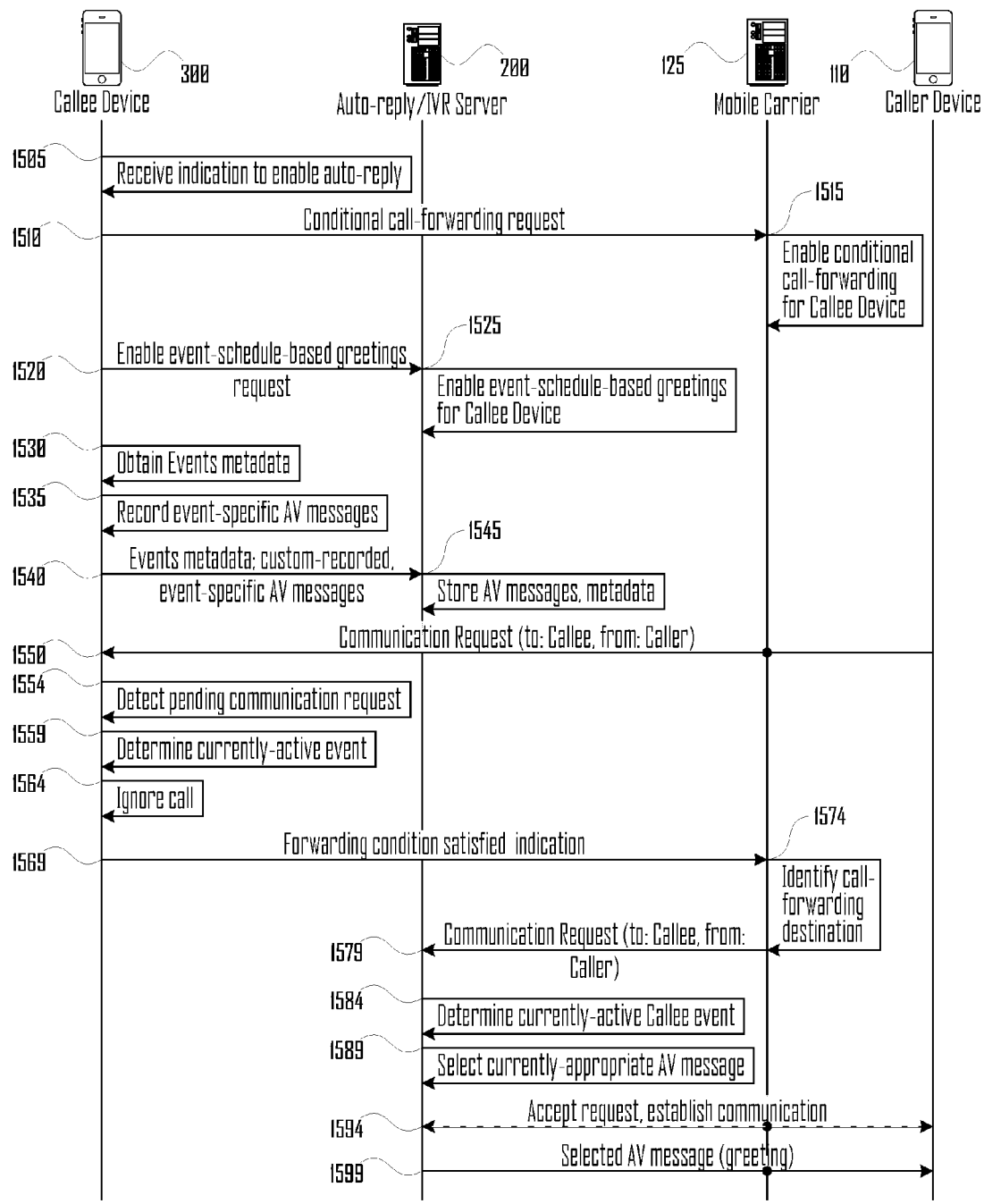
FIG. 15 illustrates an exemplary series of communications between caller device, callee device, carrier server, and auto-reply server, in accordance with one embodiment.

FIG. 15 illustrates an exemplary series of communications between caller device 110, callee device 300, carrier server 125, and auto-reply server 200, in accordance with one embodiment. In the illustrated series of communications, conditional call-forwarding is employed. "Conditional" call- or communication-forwarding refers to a process by which a carrier routes all incoming calls to the number specified when a corresponding condition is met. FEISE, forwarding conditions may include conditions such as:

No answer after specified period
Unreachable due to no signal or phone powered off
Busy on another call
User declines call Beginning the illustrated series of communications, callee device 300 receives an indication 1505 from its operator to enable an event-specific, custom-recorded auto-reply service provided by auto-reply server 200.

In response to the indication, callee device 300 sends to carrier server 125 a request 1510 to enable conditional call-forwarding, such that telephonic communications placed to callee device 300 will be forwarded to auto-reply server 200 when a forwarding condition (e.g., no answer, busy on another call, user declines call) is met. In some embodiments, callee device 300 may enable conditional call-forwarding by automatically or manually using a dial-tone interface in accordance with the Unstructured Supplementary Service Data ("USSD") protocol supported by GSM-compliant devices.

For example, in one embodiment, callee device 300 may dial a USSD number such as *718001112222 (where 8001112222 is used herein to represent an identifier of auto-reply server 200) to enable conditional call-forwarding when a 'no answer' condition is met. In another embodiment, callee device 300 may dial a USSD number such as *288001112222 to enable conditional call-forwarding when a 'busy' or 'no answer' condition is met. In other embodiments, callee device 300 may dial a USSD number such as *004*8001112222# to enable conditional call-forwarding when a 'busy', 'no answer', or 'out of reach' condition is met.

Carrier server 125 then enables 1515 conditional call-forwarding as requested. Also in response to the indication, callee device 300 sends to auto-reply server 200 a request 1520 to provide event-specific audiovisual media messages to callers whose pending calls are forwarded to auto-reply server 200. As the term is used herein, an "audiovisual media message" refers to an audio message and/or a video message.

Upon receiving request 1520, auto-reply server 200 enables 1525 the requested event-schedule-based auto-reply messaging service. Callee device 300 obtains metadata 1530 from the user. For example, in one embodiment, callee device 300 may obtain calendar data, event and/or event-type start and stop dates and/or times, or other similar metadata describing specific events and/or types of event during which the operator wishes to have event-specific, custom-recorded audiovisual media messages played to callers.

Callee device 300 also records a plurality of event-specific, custom-recorded audiovisual media message or microphone or other suitable audiovisual media sensor. Callee device 300 sends 1540 to auto-reply server 200 the metadata 1635 and event-specific, custom-recorded audiovisual media messages 1640 that it obtained as described above. Auto-reply server 200 stores 1545 metadata 1635 and event-specific, custom-recorded audiovisual media messages 1640 for subsequent use as described below.

At some point after the above-described communications have taken place, caller device 110 places a pending telephonic communication to callee device 300, sending through carrier server 125 a request 1550 to initiate communications with callee device 300.

A software process (typically provided as part of the auto-reply service) executing on callee device 300 detects 1554 the pending telephonic communication request and determines 1559 whether at least one of the specific events and/or types of event is currently active (e.g., by comparing the current date and/or time with metadata 1635). In the illustrated exemplary scenario, callee device 300 determines that the current date and/or time corresponds to at least one of the specific events and/or types of event, which causes the software process to automatically ignore 1564 the pending incoming call. For example, in one embodiment, the software process may prevent callee device 300 from ringing, buzzing, or otherwise notifying the operator that request 1655 was received.

Having prevented callee device 300 from notifying its operator of the incoming telephonic communication, the software process sends to carrier server 125 an indication 1569 that a conditional call-forwarding condition is satisfied. For example, in one embodiment, callee device 300 may indicate to carrier server 125 that callee device 300 is busy on another call (notwithstanding that callee device 300 may not actually be on another call), that the user has declined the call (notwithstanding that the user was not notified of the incoming telephonic communication), or the like.

Having received indication 1569, indicating that a conditional call-forwarding condition is satisfied, carrier server 125 identifies 1574 auto-reply server 200 as the forwarding destination for calls placed to callee device 300, and sends to auto-reply server 200 a request 1579 to handle a forwarded call from caller device 110 that was originally destined for callee device 300.

Using metadata 1635, auto-reply server 200 determines whether at least one of the specific events and/or types of event is currently active (e.g., by comparing the current date and/or time with metadata 1635). In the illustrated exemplary scenario, auto-reply server 200 determines that the current date and/or time corresponds to at least one of the specific events and/or types of event, which causes auto-reply server 200 to select 1589 a currently-appropriate one of the event-specific, custom-recorded audiovisual media messages 1640 as having been custom-recorded for the currently active specific event and/or type of event (which corresponds to the current date and/or time).

Auto-reply server 200 accepts 1594 the communication request from caller device 110, sending suitable messages to and/or through carrier server 125 and/or caller device 110 in order to establish telephonic communication with caller device 110. Having established the telephonic communication, auto-reply server 200 sends to caller device 110 the selected currently-appropriate audiovisual media message.

Figure 16:
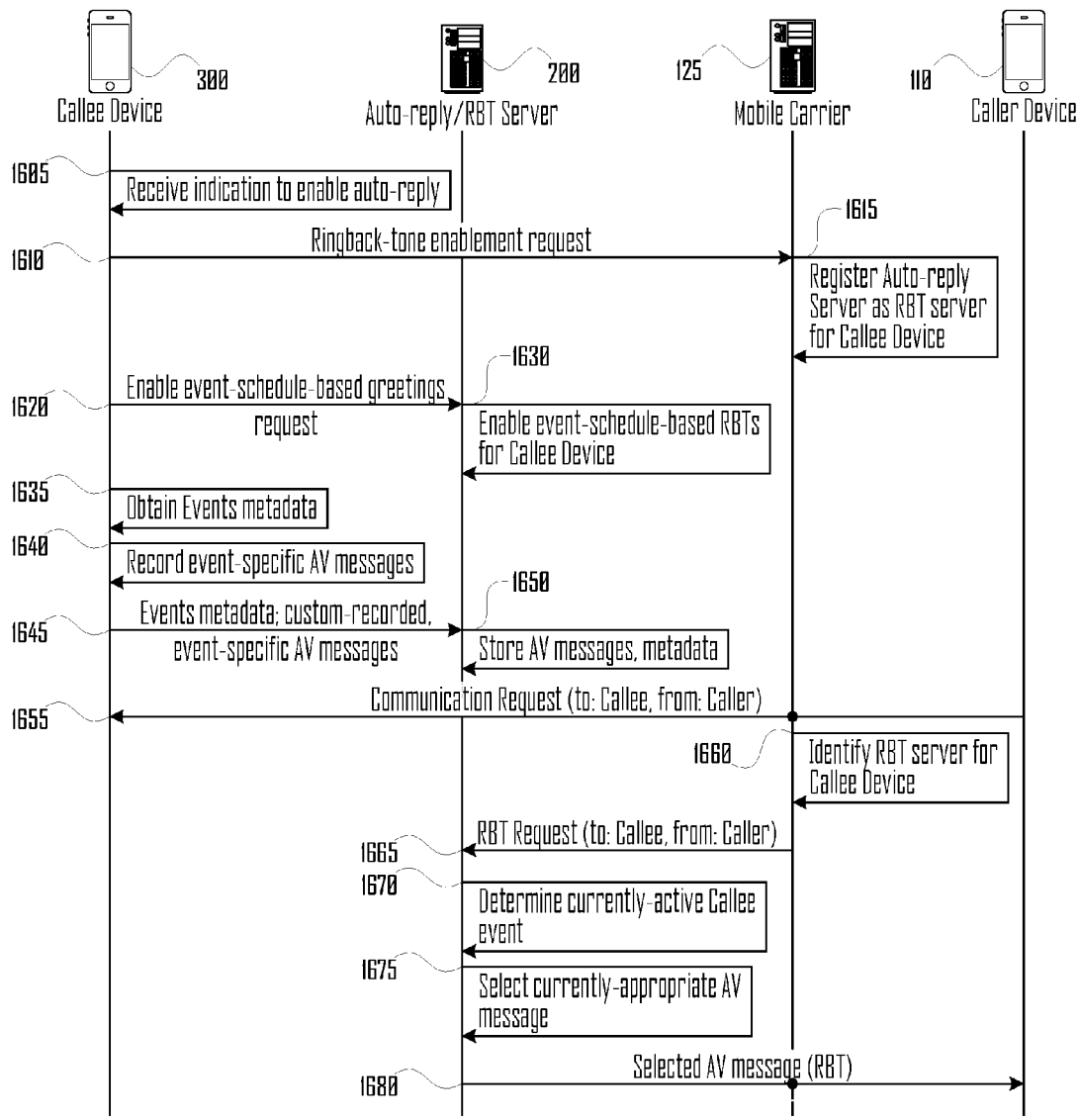
FIG. 16 illustrates an exemplary series of communications between caller device, callee device, carrier server, and auto-reply server, in accordance with one embodiment.

FIG. 16 illustrates an exemplary series of communications between caller device 110, callee device 300, carrier server 125, and auto-reply server 200, in accordance with one embodiment. In the illustrated series of communications, a "ringback tone" is employed. A ringback tone (or ringing tone) is an audible indication that is heard on the telephone line by the caller while the callee device is being rung. It is normally a repeated tone, designed to assure the calling party that the called party's line is ringing. In most public phone networks the tone is not generated in the handset or by the local switch, as customized tones or voice announcements may be generated by the distant switch or other ringback tone server (here auto-reply server 200).

Beginning the illustrated series of communications, callee device 300 receives an indication 1605 from its operator to enable an event-specific, custom-recorded auto-reply service provided by auto-reply server 200.

In response to the indication, callee device 300 sends to carrier server 125 a request 1610 that ringback tones for telephonic communications placed to callee device 300 will be provided by auto-reply server 200.

Carrier server 125 then registers 1615 auto-reply server 200 as the ringback tone provider for callee device 300. Also in response to the indication, callee device 300 sends to auto-reply server 200 a request 1620 to provide event-specific audiovisual media messages to callers as ringback tones.

Upon receiving request 1620, auto-reply server 200 enables 1630 the requested event-schedule-based auto-reply ringback-tone messaging service. Callee device 300 obtains metadata 1635 from the user. For example, in one embodiment, callee device 300 may obtain calendar data, event and/or event-type start and stop dates and/or times, or other similar metadata describing specific events and/or types of event during which the operator wishes to have event-specific, custom-recorded audiovisual media messages played to callers.

Callee device 300 also records a plurality of event-specific, custom-recorded audiovisual media message or microphone or other suitable audiovisual media sensor. Callee device 300 sends 1645 to auto-reply server 200 the metadata 1635 and event-specific, custom-recorded audiovisual media messages 1640 that it obtained as described above. Auto-reply server 200 stores 1650 metadata 1635 and event-specific, custom-recorded audiovisual media messages 1640 for subsequent use as described below.

At some point after the above-described communications have taken place, caller device 110 places a pending telephonic communication to callee device 300, sending through carrier server 125 a request 1655 to initiate communications with callee device 300.

Carrier server 125 identifies 1660 auto-reply server 200 as being the ringback tone provider for telephonic communications placed to callee device 300. Carrier server 125 therefore sends to auto-reply server 200 a request 1665 to provide a ringback tone for a call placed by caller device 110 to callee device 300.

Using metadata 1635, auto-reply server 200 determines whether at least one of the specific events and/or types of event is currently active (e.g., by comparing the current date and/or time: with metadata 1635). In the illustrated exemplary scenario, auto-reply server 200 determines that the current date and/or time corresponds to at least one of the specific events and/or types of event, which causes auto-reply server 200 to select 1675 a currently-appropriate one of the event-specific, custom-recorded audiovisual media messages 1640 as having been custom-recorded for the currently active specific event and/or type of event (which corresponds to the current date and/or time).

Auto-reply server 200 sends to caller device 110 the selected currently-appropriate audiovisual media message 1680 to be played as a ringback tone on caller device 110.

Although specific embodiments have been illustrated and described herein, it will be appreciated by those of ordinary skill in the art that alternate and/or equivalent implementations may be substituted for the specific embodiments shown and described without departing from the scope of the present disclosure. For example in some embodiments, in addition to being selected based on an event schedule, event-specific, custom-recorded audiovisual media messages may also be provided based on the identity of the caller. For example, in one embodiment, one or more custom-recorded audiovisual media messages may be associated not only with a specific event and/or type of event, but also with a set including one or more particular callers, such that two different callers who call during the same specific event and/or type of event period may receive different event-specific, custom-recorded audiovisual media messages. This application is intended to cover any adaptations or variations of the embodiments discussed herein.

The invention claimed is:

1. An auto-reply-server-implemented method for automatically responding to a telephonic communication from a caller based at least in part on an event schedule, the method comprising:

obtaining, by said auto-reply server from a remote mobile-telephony device, a plurality of audiovisual media messages, each audiovisual media message having been custom-recorded on said remote mobile-telephony device for a specific event or type of event of a plurality of events or types of event, said plurality of events or types of event corresponding respectively to a plurality of date and/or time periods, wherein at least some of said plurality of custom-recorded, event-specific audiovisual media messages are further associated with a set of one or more specific callers;

receiving, by said auto-reply server from an interactive voice response ("IVR") server at a current date and time, a request for a currently-appropriate audiovisual media message, said request having been sent in response to said IVR server's being notified that the caller is currently attempting to initiate the telephonic communication with said remote mobile-telephony device, including receiving a caller-identifier identifying the caller as being a member of said set of one or more specific callers;

selecting, by said auto-reply server, an audiovisual media message of said plurality of custom-recorded, event-specific audiovisual media messages as having been custom-recorded for an event or type of event corresponding to said current date and time and based at least in part on said caller-identifier identifying the caller as being a member of said set of one or more specific callers; and sending, by said auto-reply server to said IVR server, an indication indicating that said IVR server should play said selected audiovisual media message to the caller.

2. The method of claim 1, wherein said auto-reply server and said IVR server comprise the same server.

3. The method of claim 1, further comprising:

receiving from said remote mobile-telephony device a request to have incoming telephonic communications forwarded to said IVR server; and sending to a remote telephony-carrier server a request to enable communication-forwarding for said remote mobile-telephony device.

4. The method of claim 3, further comprising:
receiving from said remote mobile-telephony device a request to have incoming telephonic communications delivered to said remote mobile-telephony device; and
sending to a remote telephony-carrier server a request to disable communication-forwarding for said remote mobile-telephony device.

5. A computing apparatus comprising a processor and a memory having stored therein instructions that when executed by the processor, configure the apparatus to perform the method of claim 1.

6. A non-transient computer-readable storage medium having stored therein instructions that when executed by a processor, configure the processor to perform the method of claim 1.

7. A mobile-telephony-device-implemented method for automatically responding to a telephonic communication from a caller based at least in part on an event schedule, the method comprising:
recording, by the mobile-telephony device, a plurality of audiovisual media messages, each audiovisual media message being custom-recorded for a specific event or type of event of a plurality of events or types of event, said plurality of events or types of event corresponding respectively to a plurality of date and/or time periods;
providing said plurality of custom-recorded, event-specific audiovisual media messages and said plurality of date and/or time periods to an auto-reply server;
enabling, by the mobile-telephony device on a conditional basis, communication-forwarding to forward to an interactive voice response ("IVR") server incoming telephonic communications placed to the mobile-telephony device;
receiving, by the mobile-telephony device from a remote mobile-telephony server, an indication that a pending telephonic communication has been placed to the mobile-telephony device at a current date and time;
determining, by the mobile-telephony device based at least in part on said current date and time, whether said pending telephonic communication corresponds to said specific event or type of event of said plurality of events or types of event; and
when said current date and time is determined to correspond to said specific event or type of event, automatically causing, by the mobile-telephony device, said pending telephonic communication to be forwarded to said IVR server to play to the caller a selected one of said plurality of custom-recorded, event-specific audiovisual media messages;
wherein:
at least some of said plurality of custom-recorded, event-specific audiovisual media messages are further associated with a set of one or more specific callers;
receiving said indication further comprises receiving a caller-identifier identifying the caller; and
determining whether said current date and time corresponds to said specific event or type of event is further based at least in part on said caller-identifier identifying the caller as being a member of said set of one or more specific callers.

8. A computing apparatus comprising a processor and a memory having stored therein instructions that when executed by the processor, configure the apparatus to perform the method of claim 7.

9. A non-transient computer-readable storage medium having stored therein instructions that when executed by a processor, configure the processor to perform the method of claim 7.

10. The method of claim 7, wherein automatically causing said pending telephonic communication to be forwarded to said IVR server comprises signaling to said remote mobile-telephony server that said pending telephonic communication will not be answered.

* * * * *